United States Patent
Harel

(10) Patent No.: US 9,253,003 B1
(45) Date of Patent: Feb. 2, 2016

(54) FREQUENCY SHIFTING A COMMUNICATIONS SIGNAL(S) IN A MULTI-FREQUENCY DISTRIBUTED ANTENNA SYSTEM (DAS) TO AVOID OR REDUCE FREQUENCY INTERFERENCE

(71) Applicant: CORNING OPTICAL COMMUNICATIONS WIRELESS LTD, Airport (IL)

(72) Inventor: Dror Harel, Hod Hasharon (IL)

(73) Assignee: Corning Optical Communications Wireless Ltd, Airport (IL)

( * ) Notice: Subject to any disclaimer, the term of this patent is extended or adjusted under 35 U.S.C. 154(b) by 0 days.

(21) Appl. No.: 14/824,660

(22) Filed: Aug. 12, 2015

Related U.S. Application Data

(63) Continuation of application No. 14/496,349, filed on Sep. 25, 2014.

(51) Int. Cl.
| | | |
|---|---|---|
| *H03D 3/00* | (2006.01) | |
| *H04L 27/14* | (2006.01) | |
| *H04L 25/03* | (2006.01) | |

(52) U.S. Cl.
CPC .......... *H04L 27/14* (2013.01); *H04L 25/03006* (2013.01)

(58) Field of Classification Search
CPC . H04L 27/14; H04L 27/1563; H04L 27/1526; H04B 7/24; H04B 41/0816; H04J 11/0039; H04W 88/06
USPC .......... 375/334, 260, 347, 349; 370/254, 312, 370/328, 329, 344
See application file for complete search history.

(56) References Cited

U.S. PATENT DOCUMENTS

| | | | |
|---|---|---|---|
| 2,092,709 A | 9/1937 | Wheeler | |
| 2,298,435 A | 10/1942 | Tunick | |

(Continued)

FOREIGN PATENT DOCUMENTS

| | | |
|---|---|---|
| CN | 1430848 A | 7/2003 |
| CN | 101547447 B | 12/2010 |

(Continued)

OTHER PUBLICATIONS de Valicourt, et al., "Radio-Over-Fiber Access Network Architecture Based on New Optimized RSOA Devices with Large Modulation Bandwidth and High Linearity," IEEE Transactions on Microwave Theory and Techniques, vol. 58, No. 11, Nov. 2010, pp. 3248-3258.

(Continued)

*Primary Examiner* — Khai Tran
(74) *Attorney, Agent, or Firm* — C. Keith Montgomery

(57) ABSTRACT

Frequency shifting a communications signal(s) in a multiple frequency (multi-frequency) distributed antenna system (DAS) to avoid or reduce frequency interference is disclosed. Related devices, methods, and DASs are disclosed. Non-limiting examples of frequency interference include frequency band interference and frequency channel interference. As a non-limiting example, frequency interference in a multi-frequency DAS may result from non-linearity of a signal processing component generating an out-of-band harmonic of a first, in-use communications signal in a first frequency band, within different frequency band(s) of other in-use communications signal(s). To avoid or reduce such interference, embodiments disclosed herein involve predicting frequency interference that may result from processing received, in-use communications signals in multiple frequency bands to be distributed in a multi-frequency DAS. Frequency shifting is performed to avoid or reduce any interfering signal products produced from the signal processing of any in-use communications signals, from interfering in the frequencies of other in-use communications signals.

25 Claims, 10 Drawing Sheets

(56) References Cited

U.S. PATENT DOCUMENTS

| | | |
|---|---|---|
| 2,411,786 A | 11/1946 | Halstead |
| 2,568,342 A | 9/1951 | Koehler et al. |
| 2,613,285 A | 10/1952 | Fromm |
| 2,671,850 A | 3/1954 | Marcou |
| 2,747,083 A | 5/1956 | Guanella |
| 2,964,623 A | 12/1960 | Bell |
| 2,986,723 A | 5/1961 | Darwin et al. |
| 3,072,899 A | 1/1963 | Kleist et al. |
| 3,274,339 A | 9/1966 | Herry et al. |
| 3,406,344 A | 10/1968 | Hopper |
| 3,511,936 A | 5/1970 | Saltzberg |
| 3,529,088 A | 9/1970 | Hauer |
| 3,651,471 A | 3/1972 | Haselwood et al. |
| 3,656,112 A | 4/1972 | Paull |
| 3,699,250 A | 10/1972 | Bunting |
| 3,723,653 A | 3/1973 | Tatsuzawa |
| 3,872,253 A | 3/1975 | Jurschak |
| 3,873,771 A | 3/1975 | Kleinerman et al. |
| 3,875,339 A | 4/1975 | Gruen et al. |
| 3,937,889 A | 2/1976 | Bell, III et al. |
| 3,992,589 A | 11/1976 | Kuegler |
| 4,008,369 A | 2/1977 | Theurer et al. |
| 4,013,840 A | 3/1977 | Anderson |
| 4,035,838 A | 7/1977 | Bassani et al. |
| 4,049,914 A | 9/1977 | Anderson et al. |
| 4,054,910 A | 10/1977 | Chou et al. |
| 4,063,173 A | 12/1977 | Nelson et al. |
| 4,171,467 A | 10/1979 | Evenchik |
| 4,186,347 A | 1/1980 | Brockman et al. |
| 4,199,761 A | 4/1980 | Whyte et al. |
| 4,200,862 A | 4/1980 | Campbell et al. |
| 4,205,270 A | 5/1980 | Okatani et al. |
| 4,206,320 A | 6/1980 | Keasler et al. |
| 4,302,629 A | 11/1981 | Foulkes et al. |
| 4,328,579 A | 5/1982 | Hashimoto et al. |
| 4,332,980 A | 6/1982 | Reynolds et al. |
| 4,339,816 A | 7/1982 | Reed |
| 4,378,470 A | 3/1983 | Murto et al. |
| 4,387,271 A | 6/1983 | Artom |
| 4,388,489 A | 6/1983 | Wigan et al. |
| 4,393,508 A | 7/1983 | Boudault |
| 4,417,279 A | 11/1983 | Shinkawa et al. |
| 4,425,642 A | 1/1984 | Moses et al. |
| 4,433,212 A | 2/1984 | Moses et al. |
| 4,442,320 A | 4/1984 | James et al. |
| 4,442,540 A | 4/1984 | Allen |
| 4,443,662 A | 4/1984 | Nakhla |
| 4,449,218 A | 5/1984 | Strehl |
| 4,449,246 A | 5/1984 | Seiler et al. |
| 4,456,925 A | 6/1984 | Skerlos et al. |
| 4,456,985 A | 6/1984 | Carsten et al. |
| 4,456,986 A | 6/1984 | Carsten et al. |
| 4,459,434 A | 7/1984 | Benning et al. |
| 4,462,113 A | 7/1984 | Iwata |
| 4,467,140 A | 8/1984 | Fathauer et al. |
| 4,468,538 A | 8/1984 | Cripps |
| 4,476,574 A | 10/1984 | Struven |
| 4,485,400 A | 11/1984 | Lemelson et al. |
| 4,493,948 A | 1/1985 | Sues et al. |
| 4,500,751 A | 2/1985 | Darland et al. |
| 4,500,976 A | 2/1985 | DuBroff |
| 4,506,387 A | 3/1985 | Walter |
| 4,509,211 A | 4/1985 | Robbins |
| 4,521,881 A | 6/1985 | Stapleford et al. |
| 4,528,422 A | 7/1985 | Cupani |
| 4,528,519 A | 7/1985 | van Driest |
| 4,546,212 A | 10/1985 | Crowder, Sr. |
| 4,556,988 A | 12/1985 | Yoshisato |
| 4,561,020 A | 12/1985 | Matsuda |
| 4,564,940 A | 1/1986 | Yahata |
| 4,577,311 A | 3/1986 | Duquesne et al. |
| 4,577,314 A | 3/1986 | Chu et al. |
| 4,578,535 A | 3/1986 | Simmons |
| 4,578,540 A | 3/1986 | Borg et al. |
| 4,580,291 A | 4/1986 | ab der Halden |
| 4,584,690 A | 4/1986 | Cafiero et al. |
| 4,597,077 A | 6/1986 | Nelson et al. |
| 4,604,741 A | 8/1986 | Barsellotti |
| 4,608,686 A | 8/1986 | Barsellotti |
| 4,644,526 A | 2/1987 | Wu |
| 4,646,289 A | 2/1987 | Tsiakas et al. |
| 4,646,296 A | 2/1987 | Bartholet et al. |
| 4,649,551 A | 3/1987 | Sander et al. |
| 4,656,655 A | 4/1987 | Hashimoto |
| 4,665,516 A | 5/1987 | Middleton et al. |
| 4,670,870 A | 6/1987 | Hewinson et al. |
| 4,670,874 A | 6/1987 | Sato et al. |
| 4,672,602 A | 6/1987 | Hargrave et al. |
| 4,672,605 A | 6/1987 | Hustig et al. |
| 4,679,227 A | 7/1987 | Hughes-Hartogs |
| 4,706,274 A | 11/1987 | Baker et al. |
| 4,709,412 A | 11/1987 | Seymour et al. |
| 4,718,108 A | 1/1988 | Davidson et al. |
| 4,731,821 A | 3/1988 | Jackson, III |
| 4,746,809 A | 5/1988 | Coleman et al. |
| 4,754,326 A | 6/1988 | Kram et al. |
| 4,755,792 A | 7/1988 | Pezzolo et al. |
| 4,757,495 A | 7/1988 | Decker et al. |
| 4,757,497 A | 7/1988 | Beierle et al. |
| 4,764,922 A | 8/1988 | Dieter et al. |
| 4,766,402 A | 8/1988 | Crane |
| 4,768,110 A | 8/1988 | Dunlap et al. |
| 4,768,206 A | 8/1988 | Van Gerwen |
| 4,769,837 A | 9/1988 | McCormick et al. |
| 4,776,006 A | 10/1988 | Comerford et al. |
| 4,777,652 A | 10/1988 | Stolarczyk |
| 4,780,757 A | 10/1988 | Bryer et al. |
| 4,780,758 A | 10/1988 | Lin et al. |
| 4,785,448 A | 11/1988 | Reichert et al. |
| 4,785,472 A | 11/1988 | Shapiro |
| 4,789,895 A | 12/1988 | Mustafa et al. |
| 4,789,994 A | 12/1988 | Randall et al. |
| 4,799,213 A | 1/1989 | Fitzgerald |
| 4,807,225 A | 2/1989 | Fitch |
| 4,821,319 A | 4/1989 | Middleton et al. |
| 4,825,435 A | 4/1989 | Amundsen et al. |
| 4,837,799 A | 6/1989 | Prohs et al. |
| 4,839,743 A | 6/1989 | Best et al. |
| 4,849,811 A | 7/1989 | Kleinerman |
| 4,850,009 A | 7/1989 | Zook et al. |
| 4,856,085 A | 8/1989 | Horvat |
| 4,864,588 A | 9/1989 | Simpson et al. |
| 4,866,733 A | 9/1989 | Morishita |
| 4,866,757 A | 9/1989 | Nilssen |
| 4,882,747 A | 11/1989 | Williams |
| 4,885,747 A | 12/1989 | Foglia |
| 4,885,766 A | 12/1989 | Yasuoka et al. |
| 4,885,803 A | 12/1989 | Hermann et al. |
| 4,888,795 A | 12/1989 | Ando et al. |
| 4,890,316 A | 12/1989 | Walsh et al. |
| 4,893,326 A | 1/1990 | Duran et al. |
| 4,901,342 A | 2/1990 | Jones |
| 4,901,368 A | 2/1990 | Arnold et al. |
| 4,916,460 A | 4/1990 | Powell |
| 4,918,688 A | 4/1990 | Krause et al. |
| 4,918,690 A | 4/1990 | Markkula, Jr. et al. |
| 4,924,492 A | 5/1990 | Gitlin et al. |
| 4,932,022 A | 6/1990 | Keeney et al. |
| 4,932,047 A | 6/1990 | Emmons et al. |
| 4,941,200 A | 7/1990 | Leslie et al. |
| 4,941,207 A | 7/1990 | Maeda et al. |
| 4,945,404 A | 7/1990 | Miller |
| 4,947,483 A | 8/1990 | Dirr |
| 4,949,187 A | 8/1990 | Cohen |
| 4,953,160 A | 8/1990 | Gupta |
| 4,954,886 A | 9/1990 | Elberbaum |
| 4,955,048 A | 9/1990 | Iwamura et al. |
| 4,959,862 A | 9/1990 | Davidov et al. |
| 4,969,136 A | 11/1990 | Chamberlin et al. |
| 4,972,505 A | 11/1990 | Isberg |
| 4,975,896 A | 12/1990 | D'Agosto, III et al. |
| 4,975,906 A | 12/1990 | Takiyasu et al. |
| 4,979,028 A | 12/1990 | Minematsu et al. |
| 4,980,665 A | 12/1990 | Schotz |

(56) References Cited

U.S. PATENT DOCUMENTS

| | | |
|---|---|---|
| 4,985,892 A | 1/1991 | Camarata |
| 4,989,081 A | 1/1991 | Miyagawa et al. |
| 4,996,709 A | 2/1991 | Heep et al. |
| 4,999,613 A | 3/1991 | Williamson et al. |
| 5,010,399 A | 4/1991 | Goodman et al. |
| 5,036,513 A | 7/1991 | Greenblatt |
| 5,045,948 A | 9/1991 | Streck et al. |
| 5,046,135 A | 9/1991 | Hatcher |
| 5,051,822 A | 9/1991 | Rhoades |
| 5,068,890 A | 11/1991 | Nilssen |
| 5,089,886 A | 2/1992 | Grandmougin |
| 5,090,052 A | 2/1992 | Nakajima et al. |
| 5,095,497 A | 3/1992 | Aman et al. |
| 5,109,222 A | 4/1992 | Welty et al. |
| 5,109,532 A | 4/1992 | Petrovic et al. |
| 5,115,463 A | 5/1992 | Moldavsky et al. |
| 5,142,397 A | 8/1992 | Dockery |
| 5,161,021 A | 11/1992 | Tsai |
| 5,187,803 A | 2/1993 | Sohner et al. |
| 5,187,806 A | 2/1993 | Johnson et al. |
| 5,206,655 A | 4/1993 | Caille et al. |
| 5,210,788 A | 5/1993 | Nilssen |
| 5,230,086 A | 7/1993 | Saul |
| 5,247,347 A | 9/1993 | Litteral et al. |
| 5,251,053 A | 10/1993 | Heidemann |
| 5,255,268 A | 10/1993 | Cato et al. |
| 5,257,006 A | 10/1993 | Graham et al. |
| 5,265,150 A | 11/1993 | Helmkamp et al. |
| 5,283,637 A | 2/1994 | Goolcharan |
| 5,297,203 A | 3/1994 | Rose et al. |
| 5,321,736 A | 6/1994 | Beasley |
| 5,321,846 A | 6/1994 | Yokota et al. |
| 5,339,184 A | 8/1994 | Tang |
| 5,353,334 A | 10/1994 | O'Sullivan |
| 5,361,407 A | 11/1994 | Sawada et al. |
| 5,363,432 A | 11/1994 | Martin et al. |
| 5,379,005 A | 1/1995 | Aden et al. |
| 5,404,570 A | 4/1995 | Charas et al. |
| 5,408,260 A | 4/1995 | Arnon |
| 5,410,343 A | 4/1995 | Coddington et al. |
| 5,428,836 A | 6/1995 | Sanecki et al. |
| 5,432,838 A | 7/1995 | Purchase et al. |
| 5,452,289 A | 9/1995 | Sharma et al. |
| 5,457,557 A | 10/1995 | Zarem et al. |
| 5,463,616 A | 10/1995 | Kruse et al. |
| 5,469,495 A | 11/1995 | Beveridge |
| 5,481,249 A | 1/1996 | Sato |
| 5,487,069 A | 1/1996 | O'Sullivan et al. |
| 5,489,894 A | 2/1996 | Murray |
| 5,502,446 A | 3/1996 | Denninger |
| 5,537,637 A | 7/1996 | Sugita et al. |
| 5,539,821 A | 7/1996 | Blonder |
| 5,548,592 A | 8/1996 | Komarek et al. |
| 5,550,836 A | 8/1996 | Albrecht et al. |
| 5,550,898 A | 8/1996 | Abbasi et al. |
| 5,551,057 A | 8/1996 | Mitra |
| 5,553,063 A | 9/1996 | Dickson |
| 5,565,855 A | 10/1996 | Knibbe |
| 5,572,575 A | 11/1996 | Yamamoto et al. |
| 5,574,964 A | 11/1996 | Hamlin |
| 5,579,221 A | 11/1996 | Mun |
| 5,587,692 A | 12/1996 | Graham et al. |
| 5,600,333 A | 2/1997 | Justice et al. |
| 5,603,080 A | 2/1997 | Kallander et al. |
| 5,610,916 A | 3/1997 | Kostreski et al. |
| 5,619,251 A | 4/1997 | Kuroiwa et al. |
| 5,619,505 A | 4/1997 | Grube et al. |
| 5,621,455 A | 4/1997 | Rogers et al. |
| 5,625,863 A | 4/1997 | Abraham |
| 5,627,879 A | 5/1997 | Russell et al. |
| 5,628,055 A | 5/1997 | Stein |
| 5,634,191 A | 5/1997 | Beasley |
| 5,642,405 A | 6/1997 | Fischer et al. |
| 5,644,622 A | 7/1997 | Russell et al. |
| 5,646,983 A | 7/1997 | Suffern et al. |
| 5,657,358 A | 8/1997 | Panech et al. |
| 5,657,374 A | 8/1997 | Russell et al. |
| 5,675,375 A | 10/1997 | Riffee |
| 5,694,232 A | 12/1997 | Parsay et al. |
| 5,696,790 A | 12/1997 | Graham et al. |
| 5,696,861 A | 12/1997 | Schimmeyer et al. |
| 5,708,705 A | 1/1998 | Yamashita et al. |
| 5,708,961 A | 1/1998 | Hylton et al. |
| 5,722,076 A | 2/1998 | Sakabe et al. |
| 5,726,984 A | 3/1998 | Kubler et al. |
| 5,734,678 A | 3/1998 | Paneth et al. |
| 5,736,965 A | 4/1998 | Mosebrook et al. |
| 5,748,104 A | 5/1998 | Argyroudis et al. |
| 5,757,803 A | 5/1998 | Russell et al. |
| 5,758,294 A | 5/1998 | Ganesan et al. |
| 5,765,099 A | 6/1998 | Georges et al. |
| 5,774,789 A | 6/1998 | van der Kaay et al. |
| 5,778,303 A | 7/1998 | Shinozaki et al. |
| 5,787,115 A | 7/1998 | Turnbull et al. |
| 5,790,536 A | 8/1998 | Mahany et al. |
| 5,802,283 A | 9/1998 | Grady et al. |
| 5,802,463 A | 9/1998 | Zuckerman |
| 5,809,395 A | 9/1998 | Hamilton-Piercy et al. |
| 5,809,422 A | 9/1998 | Raleigh et al. |
| 5,812,184 A | 9/1998 | Martinez |
| 5,812,786 A | 9/1998 | Seazholtz et al. |
| 5,815,086 A | 9/1998 | Ivie et al. |
| 5,822,678 A | 10/1998 | Evanyk |
| 5,828,663 A | 10/1998 | Ikegami |
| 5,832,364 A | 11/1998 | Gustafson |
| 5,832,365 A | 11/1998 | Chen et al. |
| 5,835,863 A | 11/1998 | Ikenouchi et al. |
| 5,838,226 A | 11/1998 | Houggy et al. |
| 5,841,360 A | 11/1998 | Binder |
| 5,841,840 A | 11/1998 | Smith et al. |
| 5,841,841 A | 11/1998 | Dodds et al. |
| 5,848,054 A | 12/1998 | Mosebrook et al. |
| 5,848,150 A | 12/1998 | Bingel |
| 5,864,284 A | 1/1999 | Sanderson |
| 5,878,047 A | 3/1999 | Ganek et al. |
| 5,896,443 A | 4/1999 | Dichter |
| 5,896,569 A | 4/1999 | Butler et al. |
| 5,901,340 A | 5/1999 | Flickinger et al. |
| 5,903,834 A | 5/1999 | Wallstedt et al. |
| 5,905,442 A | 5/1999 | Mosebrook et al. |
| 5,910,776 A | 6/1999 | Black |
| 5,912,895 A | 6/1999 | Terry et al. |
| 5,926,531 A | 7/1999 | Petite |
| 5,929,896 A | 7/1999 | Goodman et al. |
| 5,930,340 A | 7/1999 | Bell |
| 5,930,682 A | 7/1999 | Schwartz et al. |
| 5,930,719 A | 7/1999 | Babitch et al. |
| 5,936,660 A | 8/1999 | Gurantz |
| 5,937,342 A | 8/1999 | Kline |
| 5,937,348 A | 8/1999 | Cina et al. |
| 5,940,400 A | 8/1999 | Eastmond et al. |
| 5,949,476 A | 9/1999 | Pocock et al. |
| 5,950,149 A | 9/1999 | Fieramosca et al. |
| 5,953,670 A | 9/1999 | Newson |
| 5,960,066 A | 9/1999 | Hartmann et al. |
| 5,963,539 A | 10/1999 | Webber, Jr. et al. |
| 5,963,595 A | 10/1999 | Graham et al. |
| 5,977,913 A | 11/1999 | Christ |
| 5,982,363 A | 11/1999 | Naiff |
| 5,982,784 A | 11/1999 | Bell |
| 5,982,854 A | 11/1999 | Ehreth |
| 5,983,070 A | 11/1999 | Georges et al. |
| 5,986,574 A | 11/1999 | Colton |
| 5,987,303 A | 11/1999 | Dutta et al. |
| 5,994,998 A | 11/1999 | Fisher et al. |
| 5,995,593 A | 11/1999 | Cho |
| 5,995,598 A | 11/1999 | Berstis |
| 6,002,722 A | 12/1999 | Wu |
| 6,005,873 A | 12/1999 | Amit |
| 6,005,884 A | 12/1999 | Cook et al. |
| 6,014,546 A | 1/2000 | Georges et al. |
| 6,026,150 A | 2/2000 | Frank et al. |
| 6,032,057 A | 2/2000 | Kiiski |
| 6,038,425 A | 3/2000 | Jeffrey |

(56) References Cited

U.S. PATENT DOCUMENTS

| | | |
|---|---|---|
| 6,040,759 A | 3/2000 | Sanderson |
| 6,049,705 A | 4/2000 | Xue |
| 6,052,380 A | 4/2000 | Bell |
| 6,061,357 A | 5/2000 | Olshansky et al. |
| 6,061,392 A | 5/2000 | Bremer et al. |
| 6,069,588 A | 5/2000 | O'Neill, Jr. |
| 6,069,899 A | 5/2000 | Foley |
| 6,087,860 A | 7/2000 | Liu et al. |
| 6,088,368 A | 7/2000 | Rubinstain et al. |
| 6,094,441 A | 7/2000 | Jung et al. |
| 6,101,341 A | 8/2000 | Manabe |
| 6,108,331 A | 8/2000 | Thompson |
| 6,112,086 A | 8/2000 | Wala |
| 6,115,755 A | 9/2000 | Krishan |
| 6,128,470 A | 10/2000 | Naidu et al. |
| 6,130,893 A | 10/2000 | Whittaker et al. |
| 6,130,896 A | 10/2000 | Lueker et al. |
| 6,137,865 A | 10/2000 | Ripy et al. |
| 6,141,356 A | 10/2000 | Gorman |
| 6,151,480 A | 11/2000 | Fischer et al. |
| 6,157,810 A | 12/2000 | Georges et al. |
| 6,175,860 B1 | 1/2001 | Gaucher |
| 6,192,399 B1 | 2/2001 | Goodman |
| 6,198,432 B1 | 3/2001 | Janky |
| 6,202,211 B1 | 3/2001 | Williams, Jr. |
| 6,212,227 B1 | 4/2001 | Ko et al. |
| 6,215,789 B1 | 4/2001 | Keenan et al. |
| 6,216,160 B1 | 4/2001 | Dichter |
| 6,218,931 B1 | 4/2001 | Asghar et al. |
| 6,222,503 B1 | 4/2001 | Gietema et al. |
| 6,240,166 B1 | 5/2001 | Collin et al. |
| 6,243,413 B1 | 6/2001 | Beukema |
| 6,243,571 B1 | 6/2001 | Bullock et al. |
| 6,249,671 B1 | 6/2001 | Tucker et al. |
| 6,256,296 B1 | 7/2001 | Ruziak et al. |
| 6,292,467 B1 | 9/2001 | Keller |
| 6,292,517 B1 | 9/2001 | Jeffress et al. |
| 6,310,894 B1 | 10/2001 | Counterman |
| 6,317,599 B1 | 11/2001 | Rappaport et al. |
| 6,317,884 B1 | 11/2001 | Eames et al. |
| 6,320,900 B1 | 11/2001 | Liu |
| 6,324,268 B1 | 11/2001 | Balachandran et al. |
| 6,330,244 B1 | 12/2001 | Swartz et al. |
| 6,334,219 B1 | 12/2001 | Hill et al. |
| 6,346,875 B1 | 2/2002 | Puckette et al. |
| 6,349,133 B1 | 2/2002 | Matthews et al. |
| 6,353,599 B1 | 3/2002 | Bi et al. |
| 6,370,149 B1 | 4/2002 | Gorman et al. |
| 6,389,010 B1 | 5/2002 | Kubler et al. |
| 6,389,125 B1 | 5/2002 | Ubowski |
| 6,392,349 B1 | 5/2002 | Crenshaw |
| 6,393,050 B1 | 5/2002 | Liu |
| 6,397,288 B1 | 5/2002 | Rye et al. |
| 6,400,815 B1 | 6/2002 | Gilboy et al. |
| 6,400,957 B1 | 6/2002 | Rodrigues et al. |
| 6,414,952 B2 | 7/2002 | Foley |
| 6,424,661 B1 | 7/2002 | Bentley |
| 6,427,237 B1 | 7/2002 | Aranguren et al. |
| 6,430,199 B1 | 8/2002 | Kerpez |
| 6,434,123 B1 | 8/2002 | Park |
| 6,438,109 B1 | 8/2002 | Karaoguz et al. |
| 6,449,318 B1 | 9/2002 | Rumbaugh |
| 6,452,910 B1 | 9/2002 | Vij et al. |
| 6,452,915 B1 | 9/2002 | Jorgensen |
| 6,452,923 B1 | 9/2002 | Gerszberg et al. |
| 6,470,053 B1 | 10/2002 | Liu |
| 6,473,495 B1 | 10/2002 | Willer |
| 6,473,609 B1 | 10/2002 | Schwartz et al. |
| 6,480,510 B1 | 11/2002 | Binder |
| 6,483,470 B1 | 11/2002 | Hohnstein et al. |
| 6,483,902 B1 | 11/2002 | Stewart et al. |
| 6,492,897 B1 | 12/2002 | Mowery, Jr. |
| 6,493,875 B1 | 12/2002 | Eames et al. |
| 6,501,942 B1 | 12/2002 | Weissman et al. |
| 6,513,163 B1 | 1/2003 | Silvia et al. |
| 6,522,662 B1 | 2/2003 | Liu |
| 6,522,728 B1 | 2/2003 | Willer |
| 6,522,730 B1 | 2/2003 | Timm et al. |
| 6,522,731 B2 | 2/2003 | Matsumoto |
| 6,526,581 B1 | 2/2003 | Edson |
| 6,532,279 B1 | 3/2003 | Goodman |
| 6,532,280 B1 | 3/2003 | McDonald |
| 6,535,110 B1 | 3/2003 | Arora et al. |
| 6,535,587 B1 | 3/2003 | Kobayashi |
| 6,539,011 B1 | 3/2003 | Keenan et al. |
| 6,546,098 B1 | 4/2003 | Henderson |
| 6,549,616 B1 | 4/2003 | Binder |
| 6,556,581 B1 | 4/2003 | He et al. |
| 6,560,319 B1 | 5/2003 | Binder |
| 6,563,418 B1 | 5/2003 | Moon |
| 6,563,816 B1 | 5/2003 | Nodoushani et al. |
| 6,567,981 B1 | 5/2003 | Jeffrey |
| 6,570,890 B1 | 5/2003 | Keenan et al. |
| 6,570,913 B1 | 5/2003 | Chen |
| 6,572,384 B1 | 6/2003 | Marchevsky |
| 6,573,826 B2 | 6/2003 | Pan |
| 6,574,242 B1 | 6/2003 | Keenan et al. |
| 6,577,231 B2 | 6/2003 | Litwin, Jr. et al. |
| 6,577,631 B1 | 6/2003 | Keenan et al. |
| 6,580,402 B2 | 6/2003 | Navarro et al. |
| 6,580,710 B1 | 6/2003 | Bowen et al. |
| 6,580,728 B1 | 6/2003 | Cook et al. |
| 6,580,785 B2 | 6/2003 | Bremer et al. |
| 6,583,719 B2 | 6/2003 | Okada et al. |
| 6,587,473 B2 | 7/2003 | Terry et al. |
| 6,587,479 B1 | 7/2003 | Bianchi et al. |
| 6,587,739 B1 | 7/2003 | Abrams et al. |
| 6,603,808 B1 | 8/2003 | Anne et al. |
| 6,615,074 B2 | 9/2003 | Mickle et al. |
| 6,618,578 B1 | 9/2003 | Petite |
| 6,622,304 B1 | 9/2003 | Carhart |
| 6,650,871 B1 | 11/2003 | Cannon et al. |
| 6,653,932 B1 | 11/2003 | Beamish et al. |
| 6,654,616 B1 | 11/2003 | Pope, Jr. et al. |
| 6,657,535 B1 | 12/2003 | Magbie et al. |
| 6,658,269 B1 | 12/2003 | Golemon et al. |
| 6,668,328 B1 | 12/2003 | Bell |
| 6,670,930 B2 | 12/2003 | Navarro |
| 6,678,321 B1 | 1/2004 | Graham et al. |
| 6,678,721 B1 | 1/2004 | Bell |
| 6,683,531 B2 | 1/2004 | Diamanti et al. |
| 6,690,677 B1 | 2/2004 | Binder |
| 6,693,916 B1 | 2/2004 | Chaplik et al. |
| 6,697,358 B2 | 2/2004 | Bernstein |
| 6,697,603 B1 | 2/2004 | Lovinggood et al. |
| 6,701,137 B1 | 3/2004 | Judd et al. |
| 6,701,406 B1 | 3/2004 | Chang et al. |
| 6,704,545 B1 | 3/2004 | Wala |
| 6,710,721 B1 | 3/2004 | Holowick |
| 6,711,138 B1 | 3/2004 | Pai et al. |
| 6,721,365 B1 | 4/2004 | Yin et al. |
| 6,721,419 B1 | 4/2004 | Stell et al. |
| 6,721,790 B1 | 4/2004 | Chen |
| 6,725,059 B1 | 4/2004 | Bell |
| 6,731,945 B2 | 5/2004 | Do et al. |
| 6,732,315 B2 | 5/2004 | Yagil et al. |
| 6,735,217 B1 | 5/2004 | Webber, Jr. et al. |
| 6,737,984 B1 | 5/2004 | Welles, II et al. |
| 6,738,382 B1 | 5/2004 | West et al. |
| 6,738,597 B1 | 5/2004 | Jeung et al. |
| 6,738,641 B1 | 5/2004 | Elsasser |
| 6,748,080 B2 | 6/2004 | Russ et al. |
| 6,751,441 B1 | 6/2004 | Murray et al. |
| 6,754,186 B1 | 6/2004 | Bullman |
| 6,759,946 B2 | 7/2004 | Sahinoglu et al. |
| 6,760,601 B1 | 7/2004 | Suoknuuti et al. |
| 6,763,097 B1 | 7/2004 | Vitenberg |
| 6,763,226 B1 | 7/2004 | McZeal, Jr. |
| 6,771,164 B1 | 8/2004 | Fink |
| 6,771,750 B1 | 8/2004 | Nayler et al. |
| 6,771,773 B1 | 8/2004 | Hanrieder et al. |
| 6,771,774 B1 | 8/2004 | Phan et al. |
| 6,773,632 B1 | 8/2004 | Marshall et al. |
| 6,778,549 B1 | 8/2004 | Keller |

(56) References Cited

U.S. PATENT DOCUMENTS

| | | |
|---|---|---|
| 6,778,646 B1 | 8/2004 | Sun |
| 6,778,817 B1 | 8/2004 | Bullock et al. |
| 6,781,530 B2 | 8/2004 | Moore |
| 6,782,048 B2 | 8/2004 | Santhoff |
| 6,785,296 B1 | 8/2004 | Bell |
| 6,785,558 B1 | 8/2004 | Stratford et al. |
| 6,807,463 B1 | 10/2004 | Cunningham et al. |
| 6,819,760 B1 | 11/2004 | Nayler |
| 6,822,946 B1 | 11/2004 | Wallace |
| 6,826,163 B2 | 11/2004 | Mani et al. |
| 6,826,164 B2 | 11/2004 | Mani et al. |
| 6,826,174 B1 | 11/2004 | Erekson et al. |
| 6,831,921 B2 | 12/2004 | Higgins |
| 6,831,975 B1 | 12/2004 | Easwaran et al. |
| 6,836,546 B1 | 12/2004 | Willer |
| 6,839,345 B2 | 1/2005 | Lu et al. |
| 6,842,433 B2 | 1/2005 | West et al. |
| 6,842,459 B1 | 1/2005 | Binder |
| 6,844,809 B2 | 1/2005 | Manis et al. |
| 6,850,510 B2 | 2/2005 | Kubler et al. |
| 6,857,132 B1 | 2/2005 | Rakib et al. |
| 6,862,349 B1 | 3/2005 | Beveridge |
| 6,862,353 B2 | 3/2005 | Rabenko et al. |
| 6,865,193 B2 | 3/2005 | Terk |
| 6,868,072 B1 | 3/2005 | Lin et al. |
| 6,876,056 B2 | 4/2005 | Tilmans et al. |
| 6,885,674 B2 | 4/2005 | Hunt et al. |
| 6,895,249 B2 | 5/2005 | Gaal |
| 6,901,439 B1 | 5/2005 | Bonasia et al. |
| 6,904,134 B2 | 6/2005 | Jeon et al. |
| 6,909,725 B1 | 6/2005 | Chow |
| 6,914,539 B2 | 7/2005 | Hoctor et al. |
| 6,919,858 B2 | 7/2005 | Rofougaran |
| 6,922,407 B2 | 7/2005 | Wu |
| 6,925,089 B2 | 8/2005 | Chow et al. |
| 6,931,659 B1 | 8/2005 | Kinemura |
| 6,933,835 B2 | 8/2005 | Kline |
| 6,934,754 B2 | 8/2005 | West et al. |
| 6,937,056 B2 | 8/2005 | Binder |
| 6,941,364 B2 | 9/2005 | Kim et al. |
| 6,941,576 B2 | 9/2005 | Amit |
| 6,947,408 B1 | 9/2005 | Liberti et al. |
| 6,947,736 B2 | 9/2005 | Shaver et al. |
| 6,950,567 B2 | 9/2005 | Kline |
| 6,961,303 B1 | 11/2005 | Binder |
| 6,961,312 B2 | 11/2005 | Kubler et al. |
| 6,961,763 B1 | 11/2005 | Wang et al. |
| 6,963,552 B2 | 11/2005 | Sabat, Jr. et al. |
| 6,963,559 B2 | 11/2005 | Elo |
| 6,963,936 B2 | 11/2005 | Billington et al. |
| 6,965,302 B2 | 11/2005 | Mollenkopf et al. |
| 6,980,089 B1 | 12/2005 | Kline |
| 6,985,072 B2 | 1/2006 | Omidi et al. |
| 6,985,714 B2 | 1/2006 | Akiyama et al. |
| 6,987,988 B2 | 1/2006 | Uchiyama |
| 6,989,733 B2 | 1/2006 | Simonsen et al. |
| 6,993,317 B2 | 1/2006 | Belsak, Jr. |
| 6,995,657 B2 | 2/2006 | Zalitzky et al. |
| 6,996,213 B1 | 2/2006 | De Jong |
| 6,996,837 B1 | 2/2006 | Miura et al. |
| 6,998,964 B2 | 2/2006 | Lomax, Jr. et al. |
| 7,003,102 B2 | 2/2006 | Kiko |
| 7,006,006 B2 | 2/2006 | Witkow et al. |
| 7,009,527 B2 | 3/2006 | Seo |
| 7,009,946 B1 | 3/2006 | Kardach |
| 7,015,797 B2 | 3/2006 | Kaylor et al. |
| 7,015,826 B1 | 3/2006 | Chan et al. |
| 7,016,377 B1 | 3/2006 | Chun et al. |
| 7,023,382 B1 | 4/2006 | Akano |
| 7,024,166 B2 | 4/2006 | Wallace et al. |
| 7,027,416 B1 | 4/2006 | Kriz |
| 7,027,483 B2 | 4/2006 | Santhoff et al. |
| 7,027,770 B2 | 4/2006 | Judd et al. |
| 7,035,270 B2 | 4/2006 | Moore, Jr. et al. |
| 7,035,671 B2 | 4/2006 | Solum |
| 7,039,399 B2 | 5/2006 | Fischer |
| 7,046,716 B1 | 5/2006 | Miao |
| 7,050,017 B2 | 5/2006 | King et al. |
| 7,053,838 B2 | 5/2006 | Judd |
| 7,054,303 B2 | 5/2006 | Miyazaki et al. |
| 7,064,654 B2 | 6/2006 | Berkman et al. |
| 7,088,238 B2 | 8/2006 | Karaoguz et al. |
| 7,095,849 B2 | 8/2006 | Smith et al. |
| 7,099,368 B2 | 8/2006 | Santhoff et al. |
| 7,099,621 B1 | 8/2006 | Chadwick |
| 7,103,240 B2 | 9/2006 | Kline |
| 7,103,377 B2 | 9/2006 | Bauman et al. |
| 7,106,721 B1 | 9/2006 | Binder |
| 7,113,134 B1 | 9/2006 | Berkman |
| 7,113,574 B1 | 9/2006 | Haas et al. |
| 7,113,763 B2 | 9/2006 | Heinonen et al. |
| 7,117,520 B2 | 10/2006 | Stewart |
| 7,123,939 B1 | 10/2006 | Bird et al. |
| 7,127,175 B2 | 10/2006 | Mani et al. |
| 7,133,729 B1 | 11/2006 | Wang et al. |
| 7,142,535 B2 | 11/2006 | Kubler et al. |
| 7,142,560 B2 | 11/2006 | Mansfield |
| 7,142,563 B1 | 11/2006 | Lin |
| 7,149,474 B1 | 12/2006 | Mikhak |
| 7,151,575 B1 | 12/2006 | Landry et al. |
| 7,154,996 B2 | 12/2006 | Strauss |
| 7,155,214 B2 | 12/2006 | Struthers et al. |
| 7,164,886 B2 | 1/2007 | Mowery et al. |
| 7,167,078 B2 | 1/2007 | Pourchot |
| 7,167,525 B2 | 1/2007 | Santhoff et al. |
| 7,167,923 B2 | 1/2007 | Lo |
| 7,171,244 B2 | 1/2007 | Bauman |
| 7,181,023 B1 | 2/2007 | Andrews et al. |
| 7,194,251 B2 | 3/2007 | Rubinstein et al. |
| 7,199,443 B2 | 4/2007 | Elsharawy |
| 7,209,719 B2 | 4/2007 | Liebenow |
| 7,209,945 B2 | 4/2007 | Hicks, III et al. |
| 7,257,106 B2 | 8/2007 | Chen et al. |
| 7,257,108 B2 | 8/2007 | Cheston et al. |
| 7,263,293 B2 | 8/2007 | Ommodt et al. |
| 7,266,344 B2 | 9/2007 | Rodriguez |
| 7,269,311 B2 | 9/2007 | Kim et al. |
| 7,292,859 B2 | 11/2007 | Park |
| 7,299,287 B1 | 11/2007 | Rubinstein et al. |
| 7,315,735 B2 | 1/2008 | Graham |
| 7,317,793 B2 | 1/2008 | Binder et al. |
| 7,321,316 B2 | 1/2008 | Hancock et al. |
| 7,359,449 B2 | 4/2008 | Feher |
| 7,359,674 B2 | 4/2008 | Markki et al. |
| 7,366,151 B2 | 4/2008 | Kubler et al. |
| 7,369,526 B2 | 5/2008 | Lechleider et al. |
| 7,412,224 B2 | 8/2008 | Kotola et al. |
| 7,442,679 B2 | 10/2008 | Stolte et al. |
| 7,451,365 B2 | 11/2008 | Wang et al. |
| 7,460,507 B2 | 12/2008 | Kubler et al. |
| 7,469,105 B2 | 12/2008 | Wake et al. |
| 7,508,785 B2 | 3/2009 | Dale et al. |
| 7,539,509 B2 | 5/2009 | Bauman et al. |
| 7,542,452 B2 | 6/2009 | Penumetsa |
| 7,546,138 B2 | 6/2009 | Bauman |
| 7,548,695 B2 | 6/2009 | Wake |
| 7,551,641 B2 | 6/2009 | Pirzada et al. |
| 7,557,758 B2 | 7/2009 | Rofougaran |
| 7,580,384 B2 | 8/2009 | Kubler et al. |
| 7,586,861 B2 | 9/2009 | Kubler et al. |
| 7,599,420 B2 | 10/2009 | Forenza et al. |
| 7,630,690 B2 | 12/2009 | Kaewell, Jr. et al. |
| 7,633,934 B2 | 12/2009 | Kubler et al. |
| 7,639,982 B2 | 12/2009 | Wala |
| 7,646,743 B2 | 1/2010 | Kubler et al. |
| 7,646,777 B2 | 1/2010 | Hicks, III et al. |
| 7,653,397 B2 | 1/2010 | Pernu et al. |
| 7,668,565 B2 | 2/2010 | Ylänen et al. |
| 7,688,811 B2 | 3/2010 | Kubler et al. |
| 7,693,486 B2 | 4/2010 | Kasslin et al. |
| 7,697,467 B2 | 4/2010 | Kubler et al. |
| 7,715,375 B2 | 5/2010 | Kubler et al. |
| 7,720,510 B2 | 5/2010 | Pescod et al. |
| 7,751,374 B2 | 7/2010 | Donovan |

(56) References Cited

U.S. PATENT DOCUMENTS

| | | | |
|---|---|---|---|
| 7,751,838 B2 | 7/2010 | Ramesh et al. |
| 7,760,703 B2 | 7/2010 | Kubler et al. |
| 7,761,093 B2 | 7/2010 | Sabat, Jr. et al. |
| 7,768,951 B2 | 8/2010 | Kubler et al. |
| 7,773,573 B2 | 8/2010 | Chung et al. |
| 7,778,603 B2 | 8/2010 | Palin et al. |
| 7,787,854 B2 | 8/2010 | Conyers et al. |
| 7,805,073 B2 | 9/2010 | Sabat, Jr. et al. |
| 7,809,012 B2 | 10/2010 | Ruuska et al. |
| 7,813,451 B2 | 10/2010 | Binder et al. |
| 7,817,958 B2 | 10/2010 | Scheinert et al. |
| 7,817,969 B2 | 10/2010 | Castaneda et al. |
| 7,835,328 B2 | 11/2010 | Stephens et al. |
| 7,844,273 B2 | 11/2010 | Scheinert |
| 7,848,316 B2 | 12/2010 | Kubler et al. |
| 7,848,731 B1 | 12/2010 | Dianda et al. |
| 7,853,234 B2 | 12/2010 | Afsahi |
| 7,870,321 B2 | 1/2011 | Rofougaran |
| 7,881,755 B1 | 2/2011 | Mishra et al. |
| 7,894,423 B2 | 2/2011 | Kubler et al. |
| 7,899,007 B2 | 3/2011 | Kubler et al. |
| 7,907,972 B2 | 3/2011 | Walton et al. |
| 7,912,043 B2 | 3/2011 | Kubler et al. |
| 7,916,706 B2 | 3/2011 | Kubler et al. |
| 7,917,177 B2 | 3/2011 | Bauman |
| 7,920,553 B2 | 4/2011 | Kubler et al. |
| 7,920,858 B2 | 4/2011 | Sabat, Jr. et al. |
| 7,924,783 B1 | 4/2011 | Mahany et al. |
| 7,929,940 B1 | 4/2011 | Dianda et al. |
| 7,936,713 B2 | 5/2011 | Kubler et al. |
| 7,948,897 B2 | 5/2011 | Stuart et al. |
| 7,949,364 B2 | 5/2011 | Kasslin et al. |
| 7,957,777 B1 | 6/2011 | Vu et al. |
| 7,969,009 B2 | 6/2011 | Chandrasekaran |
| 7,969,911 B2 | 6/2011 | Mahany et al. |
| 7,990,925 B2 | 8/2011 | Tinnakornsrisuphap et al. |
| 7,996,020 B1 | 8/2011 | Chhabra |
| 8,018,907 B2 | 9/2011 | Kubler et al. |
| 8,036,308 B2 | 10/2011 | Rofougaran |
| 8,082,353 B2 | 12/2011 | Huber et al. |
| 8,086,192 B2 | 12/2011 | Rofougaran et al. |
| 8,107,464 B2 | 1/2012 | Schmidt et al. |
| 8,135,102 B2 | 3/2012 | Wiwel et al. |
| 8,174,428 B2 | 5/2012 | Wegener |
| 8,175,649 B2 | 5/2012 | Saban et al. |
| 8,213,401 B2 | 7/2012 | Fischer et al. |
| 8,270,387 B2 | 9/2012 | Cannon et al. |
| 8,274,929 B2 | 9/2012 | Schmidt et al. |
| 8,279,800 B2 | 10/2012 | Schmidt et al. |
| 8,306,563 B2 | 11/2012 | Zavadsky et al. |
| 8,320,957 B2 | 11/2012 | Saban et al. |
| 8,326,313 B2 | 12/2012 | McHenry et al. |
| 8,346,091 B2 | 1/2013 | Kummetz et al. |
| 8,346,278 B2 | 1/2013 | Wala et al. |
| 8,396,368 B2 | 3/2013 | Tarlazzi et al. |
| 8,422,884 B2 | 4/2013 | Mao |
| 8,428,510 B2 | 4/2013 | Stratford et al. |
| 8,462,683 B2 | 6/2013 | Uyehara et al. |
| 8,467,823 B2 | 6/2013 | Seki et al. |
| 8,472,579 B2 | 6/2013 | Uyehara et al. |
| 8,532,242 B2 | 9/2013 | Fischer et al. |
| 8,548,526 B2 | 10/2013 | Schmidt et al. |
| 8,583,100 B2 | 11/2013 | Koziy et al. |
| 8,634,766 B2 | 1/2014 | Hobbs et al. |
| 8,681,917 B2 | 3/2014 | McAllister et al. |
| 8,693,342 B2 | 4/2014 | Uyehara et al. |
| 8,694,034 B2 | 4/2014 | Notargiacomo |
| 8,699,982 B2 | 4/2014 | Singh |
| 8,724,664 B2 | 5/2014 | Stapleton et al. |
| 8,737,300 B2 | 5/2014 | Stapleton et al. |
| 8,743,756 B2 | 6/2014 | Uyehara et al. |
| 8,792,933 B2 | 7/2014 | Chen |
| 8,908,607 B2 | 12/2014 | Kummetz et al. |
| 8,948,816 B2 | 2/2015 | Fischer et al. |
| 8,958,789 B2 | 2/2015 | Bauman et al. |
| 8,976,067 B2 | 3/2015 | Fischer |
| 9,001,811 B2 | 4/2015 | Wala et al. |
| 2001/0040472 A1 | 11/2001 | Suga et al. |
| 2002/0003873 A1 | 1/2002 | Rabenko et al. |
| 2002/0006137 A1 | 1/2002 | Rabenko et al. |
| 2002/0011923 A1 | 1/2002 | Cunningham et al. |
| 2002/0019966 A1 | 2/2002 | Yagil et al. |
| 2002/0034220 A1 | 3/2002 | Duxbury |
| 2002/0035624 A1 | 3/2002 | Kim |
| 2002/0037004 A1 | 3/2002 | Bossemeyer et al. |
| 2002/0038459 A1 | 3/2002 | Talmola et al. |
| 2002/0039388 A1 | 4/2002 | Smart et al. |
| 2002/0049036 A1 | 4/2002 | Bullock et al. |
| 2002/0052188 A1 | 5/2002 | Behbahani |
| 2002/0060617 A1 | 5/2002 | Walbeck et al. |
| 2002/0061012 A1 | 5/2002 | Thi et al. |
| 2002/0061763 A1 | 5/2002 | Weissman |
| 2002/0075806 A1 | 6/2002 | Shalvi et al. |
| 2002/0103012 A1 | 8/2002 | Kim et al. |
| 2002/0123365 A1 | 9/2002 | Thorson et al. |
| 2002/0128009 A1 | 9/2002 | Boch et al. |
| 2002/0128043 A1 | 9/2002 | Chandler |
| 2002/0144159 A1 | 10/2002 | Wu et al. |
| 2002/0146207 A1 | 10/2002 | Chu |
| 2002/0165989 A1 | 11/2002 | Etoh |
| 2002/0166124 A1 | 11/2002 | Gurantz et al. |
| 2002/0176567 A1 | 11/2002 | Chen et al. |
| 2002/0186836 A1 | 12/2002 | Leuca et al. |
| 2002/0194383 A1 | 12/2002 | Cohen et al. |
| 2002/0198952 A1 | 12/2002 | Bell |
| 2003/0006881 A1 | 1/2003 | Reyes |
| 2003/0016418 A1 | 1/2003 | Westbrook et al. |
| 2003/0016794 A1 | 1/2003 | Brothers |
| 2003/0018975 A1 | 1/2003 | Stone |
| 2003/0031191 A1 | 2/2003 | El Wardani et al. |
| 2003/0053484 A1 | 3/2003 | Sorenson et al. |
| 2003/0062990 A1 | 4/2003 | Schaeffer, Jr. et al. |
| 2003/0067910 A1 | 4/2003 | Razazian et al. |
| 2003/0068033 A1 | 4/2003 | Kiko |
| 2003/0099228 A1 | 5/2003 | Alcock |
| 2003/0100288 A1 | 5/2003 | Tomlinson, Jr. et al. |
| 2003/0100330 A1 | 5/2003 | Tomlinson, Jr. et al. |
| 2003/0106067 A1 | 6/2003 | Hoskins et al. |
| 2003/0112965 A1 | 6/2003 | McNamara et al. |
| 2003/0139151 A1 | 7/2003 | Lifshitz et al. |
| 2003/0169752 A1 | 9/2003 | Chen et al. |
| 2003/0179868 A1 | 9/2003 | Binder |
| 2003/0224728 A1 | 12/2003 | Heinonen et al. |
| 2004/0017785 A1 | 1/2004 | Zelst |
| 2004/0032373 A1 | 2/2004 | Petros et al. |
| 2004/0073597 A1 | 4/2004 | Caveney et al. |
| 2004/0077310 A1 | 4/2004 | Levy |
| 2004/0083262 A1 | 4/2004 | Trantow |
| 2004/0085976 A1 | 5/2004 | Dale et al. |
| 2004/0090984 A1 | 5/2004 | Saint-Hilaire et al. |
| 2004/0100930 A1 | 5/2004 | Shapira et al. |
| 2004/0102196 A1 | 5/2004 | Weckstrom et al. |
| 2004/0105435 A1 | 6/2004 | Morioka |
| 2004/0106435 A1 | 6/2004 | Bauman et al. |
| 2004/0107299 A1 | 6/2004 | Lee et al. |
| 2004/0123322 A1 | 6/2004 | Erkocevic et al. |
| 2004/0125870 A1 | 7/2004 | Yamazaki |
| 2004/0131357 A1 | 7/2004 | Farmer et al. |
| 2004/0136388 A1 | 7/2004 | Schaff |
| 2004/0146020 A1 | 7/2004 | Kubler et al. |
| 2004/0151164 A1 | 8/2004 | Kubler et al. |
| 2004/0151305 A1 | 8/2004 | Binder et al. |
| 2004/0158649 A1 | 8/2004 | Ophir et al. |
| 2004/0160346 A1 | 8/2004 | Husted et al. |
| 2004/0160912 A1 | 8/2004 | Kubler et al. |
| 2004/0160913 A1 | 8/2004 | Kubler et al. |
| 2004/0162117 A1 | 8/2004 | Liebenow |
| 2004/0165573 A1 | 8/2004 | Kubler et al. |
| 2004/0187156 A1 | 9/2004 | Palm et al. |
| 2004/0192285 A1 | 9/2004 | Capobianco et al. |
| 2004/0198236 A1 | 10/2004 | Paine et al. |
| 2004/0201457 A1 | 10/2004 | O'Toole et al. |
| 2004/0203387 A1 | 10/2004 | Grannan |
| 2004/0204036 A1 | 10/2004 | Yang |

(56) References Cited

U.S. PATENT DOCUMENTS

| | | |
|---|---|---|
| 2004/0204040 A1 | 10/2004 | Heijnen |
| 2004/0208167 A1 | 10/2004 | Kishida |
| 2004/0208599 A1 | 10/2004 | Swartz et al. |
| 2004/0213351 A1 | 10/2004 | Shattil |
| 2004/0225740 A1 | 11/2004 | Klemba et al. |
| 2004/0235468 A1 | 11/2004 | Luebke et al. |
| 2004/0248531 A1 | 12/2004 | Takaki |
| 2004/0255332 A1 | 12/2004 | Bertonis et al. |
| 2004/0259538 A1 | 12/2004 | Agbegnenou |
| 2004/0264087 A1 | 12/2004 | Bishop |
| 2004/0268160 A1 | 12/2004 | Atkinson et al. |
| 2005/0010954 A1 | 1/2005 | Binder |
| 2005/0018648 A1 | 1/2005 | Scheelke |
| 2005/0018857 A1 | 1/2005 | McCarty et al. |
| 2005/0024945 A1 | 2/2005 | Forbes |
| 2005/0034159 A1 | 2/2005 | Ophir et al. |
| 2005/0038875 A1 | 2/2005 | Park |
| 2005/0047379 A1 | 3/2005 | Boyden et al. |
| 2005/0073968 A1 | 4/2005 | Perlman |
| 2005/0076149 A1 | 4/2005 | McKown et al. |
| 2005/0076151 A1 | 4/2005 | Tapperson et al. |
| 2005/0076375 A1 | 4/2005 | Nakamura |
| 2005/0084004 A1 | 4/2005 | Bione |
| 2005/0086694 A1 | 4/2005 | Hicks et al. |
| 2005/0089061 A1 | 4/2005 | Logvinov et al. |
| 2005/0114325 A1 | 5/2005 | Liu et al. |
| 2005/0117545 A1 | 6/2005 | Wittwer et al. |
| 2005/0136972 A1 | 6/2005 | Smith et al. |
| 2005/0144647 A1 | 6/2005 | Zussman et al. |
| 2005/0147067 A1 | 7/2005 | Mani et al. |
| 2005/0147071 A1 | 7/2005 | Karaoguz et al. |
| 2005/0152337 A1 | 7/2005 | Wurtzel et al. |
| 2005/0164666 A1 | 7/2005 | Lang et al. |
| 2005/0180561 A1 | 8/2005 | Hazani et al. |
| 2005/0181839 A1 | 8/2005 | Tiainen et al. |
| 2005/0184915 A1 | 8/2005 | Nagel et al. |
| 2005/0201323 A1 | 9/2005 | Mani et al. |
| 2005/0226200 A1 | 10/2005 | Askildsen et al. |
| 2005/0226206 A1 | 10/2005 | An |
| 2005/0239400 A1 | 10/2005 | Narikawa |
| 2005/0265428 A1 | 12/2005 | McCorkle |
| 2005/0265430 A1 | 12/2005 | Ozluturk et al. |
| 2005/0268322 A1 | 12/2005 | Watson |
| 2005/0280598 A1 | 12/2005 | Webb et al. |
| 2006/0007945 A1 | 1/2006 | Schoettle et al. |
| 2006/0018328 A1 | 1/2006 | Mody et al. |
| 2006/0045524 A1 | 3/2006 | Lee et al. |
| 2006/0045525 A1 | 3/2006 | Lee et al. |
| 2006/0048197 A1 | 3/2006 | Petruzzelli |
| 2006/0056283 A1 | 3/2006 | Anikhindi et al. |
| 2006/0066455 A1 | 3/2006 | Hancock et al. |
| 2006/0072684 A1 | 4/2006 | Feher |
| 2006/0098620 A1 | 5/2006 | Zhou et al. |
| 2006/0126617 A1 | 6/2006 | Cregg et al. |
| 2006/0128425 A1 | 6/2006 | Rooyen |
| 2006/0133465 A1 | 6/2006 | Dockemeyer, Jr. et al. |
| 2006/0152344 A1 | 7/2006 | Mowery, Jr. |
| 2006/0153169 A1 | 7/2006 | Koifman et al. |
| 2006/0172781 A1 | 8/2006 | Mohebbi |
| 2006/0193310 A1 | 8/2006 | Landry et al. |
| 2006/0193313 A1 | 8/2006 | Landry et al. |
| 2006/0193336 A1 | 8/2006 | Landry et al. |
| 2006/0210278 A1 | 9/2006 | Cregg et al. |
| 2006/0215680 A1 | 9/2006 | Camagna |
| 2006/0220833 A1 | 10/2006 | Berkman |
| 2006/0222086 A1 | 10/2006 | Frye, Jr. |
| 2006/0238250 A1 | 10/2006 | Camagna et al. |
| 2006/0251086 A1 | 11/2006 | Ha et al. |
| 2006/0251094 A1 | 11/2006 | Van Vleck et al. |
| 2006/0251159 A1 | 11/2006 | Huotari et al. |
| 2006/0251179 A1 | 11/2006 | Ghoshal |
| 2006/0262014 A1 | 11/2006 | Shemesh et al. |
| 2006/0274704 A1 | 12/2006 | Desai et al. |
| 2006/0274745 A1 | 12/2006 | Wang et al. |
| 2006/0276227 A1 | 12/2006 | Dravida |
| 2006/0280197 A1 | 12/2006 | Stone |
| 2006/0286958 A1 | 12/2006 | Lee et al. |
| 2006/0291493 A1 | 12/2006 | Schley-May et al. |
| 2007/0002772 A1 | 1/2007 | Berkman et al. |
| 2007/0002876 A1 | 1/2007 | Berkman et al. |
| 2007/0008939 A1 | 1/2007 | Fischer |
| 2007/0019959 A1 | 1/2007 | Retnasothie et al. |
| 2007/0025368 A1 | 2/2007 | Ha et al. |
| 2007/0047573 A1 | 3/2007 | Logvinov et al. |
| 2007/0054622 A1 | 3/2007 | Berkman |
| 2007/0058666 A1 | 3/2007 | Pratt |
| 2007/0060045 A1 | 3/2007 | Prautzsch |
| 2007/0060055 A1 | 3/2007 | Desai et al. |
| 2007/0076649 A1 | 4/2007 | Lin et al. |
| 2007/0082649 A1 | 4/2007 | Chan |
| 2007/0083668 A1 | 4/2007 | Kelsey et al. |
| 2007/0104168 A1 | 5/2007 | Polson |
| 2007/0112939 A1 | 5/2007 | Wilson et al. |
| 2007/0139188 A1 | 6/2007 | Ollis et al. |
| 2007/0167144 A1 | 7/2007 | Koga et al. |
| 2007/0177495 A1 | 8/2007 | Ametsitsi |
| 2007/0198748 A1 | 8/2007 | Ametsitsi et al. |
| 2007/0206629 A1 | 9/2007 | Choi |
| 2007/0224954 A1 | 9/2007 | Gopi |
| 2007/0254714 A1 | 11/2007 | Martich et al. |
| 2007/0264009 A1 | 11/2007 | Sabat, Jr. et al. |
| 2007/0268846 A1 | 11/2007 | Proctor, Jr. et al. |
| 2007/0268886 A1 | 11/2007 | Caspi et al. |
| 2007/0292143 A1 | 12/2007 | Yu et al. |
| 2007/0297005 A1 | 12/2007 | Montierth et al. |
| 2008/0043714 A1 | 2/2008 | Pernu |
| 2008/0063397 A1 | 3/2008 | Hu et al. |
| 2008/0098203 A1 | 4/2008 | Master et al. |
| 2008/0118014 A1 | 5/2008 | Reunamaki et al. |
| 2008/0129634 A1 | 6/2008 | Pera et al. |
| 2008/0134194 A1 | 6/2008 | Liu |
| 2008/0144493 A1 | 6/2008 | Yeh |
| 2008/0207253 A1 | 8/2008 | Jaakkola et al. |
| 2008/0232305 A1 | 9/2008 | Oren et al. |
| 2008/0253351 A1 | 10/2008 | Pernu et al. |
| 2008/0261656 A1 | 10/2008 | Bella et al. |
| 2008/0268833 A1 | 10/2008 | Huang et al. |
| 2008/0279137 A1 | 11/2008 | Pernu et al. |
| 2008/0280569 A1 | 11/2008 | Hazani et al. |
| 2008/0291830 A1 | 11/2008 | Pernu et al. |
| 2008/0291985 A1 | 11/2008 | Adnani et al. |
| 2008/0292322 A1 | 11/2008 | Daghighian et al. |
| 2009/0022304 A1 | 1/2009 | Kubler et al. |
| 2009/0028087 A1 | 1/2009 | Nguyen et al. |
| 2009/0028317 A1 | 1/2009 | Ling et al. |
| 2009/0047023 A1 | 2/2009 | Pescod et al. |
| 2009/0059903 A1 | 3/2009 | Kubler et al. |
| 2009/0061796 A1 | 3/2009 | Arkko et al. |
| 2009/0073916 A1 | 3/2009 | Zhang et al. |
| 2009/0149221 A1 | 6/2009 | Liu et al. |
| 2009/0175214 A1 | 7/2009 | Sfar et al. |
| 2009/0180407 A1 | 7/2009 | Sabat et al. |
| 2009/0180426 A1 | 7/2009 | Sabat et al. |
| 2009/0218407 A1 | 9/2009 | Rofougaran |
| 2009/0218657 A1 | 9/2009 | Rofougaran |
| 2009/0245084 A1 | 10/2009 | Moffatt et al. |
| 2009/0245153 A1 | 10/2009 | Li et al. |
| 2009/0245221 A1 | 10/2009 | Piipponen |
| 2009/0252136 A1 | 10/2009 | Mahany et al. |
| 2009/0252139 A1 | 10/2009 | Ludovico et al. |
| 2009/0252204 A1 | 10/2009 | Shatara et al. |
| 2009/0252205 A1 | 10/2009 | Rheinfelder et al. |
| 2009/0258652 A1 | 10/2009 | Lambert et al. |
| 2009/0285147 A1 | 11/2009 | Subasic et al. |
| 2009/0316608 A1 | 12/2009 | Singh et al. |
| 2009/0316609 A1 | 12/2009 | Singh |
| 2010/0002626 A1 | 1/2010 | Schmidt et al. |
| 2010/0002661 A1 | 1/2010 | Schmidt et al. |
| 2010/0002662 A1 | 1/2010 | Schmidt et al. |
| 2010/0014494 A1 | 1/2010 | Schmidt et al. |
| 2010/0027443 A1 | 2/2010 | LoGalbo et al. |
| 2010/0056200 A1 | 3/2010 | Tolonen |
| 2010/0074267 A1 | 3/2010 | Ladd |
| 2010/0080154 A1 | 4/2010 | Noh et al. |

(56) References Cited

U.S. PATENT DOCUMENTS

| | | |
|---|---|---|
| 2010/0080182 A1 | 4/2010 | Kubler et al. |
| 2010/0091475 A1 | 4/2010 | Toms et al. |
| 2010/0097952 A1 | 4/2010 | McHenry et al. |
| 2010/0105332 A1 | 4/2010 | McHenry et al. |
| 2010/0118864 A1 | 5/2010 | Kubler et al. |
| 2010/0118894 A1 | 5/2010 | Aweya et al. |
| 2010/0127937 A1 | 5/2010 | Chandrasekaran et al. |
| 2010/0134257 A1 | 6/2010 | Puleston et al. |
| 2010/0142955 A1 | 6/2010 | Yu et al. |
| 2010/0148373 A1 | 6/2010 | Chandrasekaran |
| 2010/0148383 A1 | 6/2010 | DiGiovanni et al. |
| 2010/0156721 A1 | 6/2010 | Alamouti et al. |
| 2010/0173586 A1 | 7/2010 | McHenry et al. |
| 2010/0188998 A1 | 7/2010 | Pernu et al. |
| 2010/0190509 A1 | 7/2010 | Davis |
| 2010/0202326 A1 | 8/2010 | Rofougaran et al. |
| 2010/0225413 A1 | 9/2010 | Rofougaran et al. |
| 2010/0225556 A1 | 9/2010 | Rofougaran et al. |
| 2010/0225557 A1 | 9/2010 | Rofougaran et al. |
| 2010/0232323 A1 | 9/2010 | Kubler et al. |
| 2010/0246558 A1 | 9/2010 | Harel |
| 2010/0255774 A1 | 10/2010 | Kenington |
| 2010/0258949 A1 | 10/2010 | Henderson et al. |
| 2010/0260063 A1 | 10/2010 | Kubler et al. |
| 2010/0278530 A1 | 11/2010 | Kummetz et al. |
| 2010/0290355 A1 | 11/2010 | Roy et al. |
| 2010/0309049 A1 | 12/2010 | Reunamäki et al. |
| 2010/0311472 A1 | 12/2010 | Rofougaran et al. |
| 2010/0311480 A1 | 12/2010 | Raines et al. |
| 2010/0329161 A1 | 12/2010 | Ylanen et al. |
| 2010/0329166 A1 | 12/2010 | Mahany et al. |
| 2010/0329680 A1 | 12/2010 | Presi et al. |
| 2011/0002687 A1 | 1/2011 | Sabat, Jr. et al. |
| 2011/0007724 A1 | 1/2011 | Mahany et al. |
| 2011/0007733 A1 | 1/2011 | Kubler et al. |
| 2011/0021146 A1 | 1/2011 | Pernu |
| 2011/0021224 A1 | 1/2011 | Koskinen et al. |
| 2011/0026932 A1 | 2/2011 | Yeh et al. |
| 2011/0065450 A1 | 3/2011 | Kazmi |
| 2011/0069668 A1 | 3/2011 | Chion et al. |
| 2011/0071734 A1 | 3/2011 | Van Wiemeersch et al. |
| 2011/0086614 A1 | 4/2011 | Brisebois et al. |
| 2011/0116572 A1 | 5/2011 | Lee et al. |
| 2011/0126071 A1 | 5/2011 | Han et al. |
| 2011/0149879 A1 | 6/2011 | Noriega et al. |
| 2011/0158298 A1 | 6/2011 | Djadi et al. |
| 2011/0170424 A1 | 7/2011 | Safavi |
| 2011/0182230 A1 | 7/2011 | Ohm et al. |
| 2011/0194475 A1 | 8/2011 | Kim et al. |
| 2011/0201368 A1 | 8/2011 | Faccin et al. |
| 2011/0204504 A1 | 8/2011 | Henderson et al. |
| 2011/0211439 A1 | 9/2011 | Manpuria et al. |
| 2011/0215901 A1 | 9/2011 | Van Wiemeersch et al. |
| 2011/0222415 A1 | 9/2011 | Ramamurthi et al. |
| 2011/0222434 A1 | 9/2011 | Chen |
| 2011/0222619 A1 | 9/2011 | Ramamurthi et al. |
| 2011/0223958 A1 | 9/2011 | Chen et al. |
| 2011/0223960 A1 | 9/2011 | Chen et al. |
| 2011/0223961 A1 | 9/2011 | Chen et al. |
| 2011/0227795 A1 | 9/2011 | Lopez et al. |
| 2011/0243201 A1 | 10/2011 | Phillips et al. |
| 2011/0244887 A1 | 10/2011 | Dupray et al. |
| 2011/0256878 A1 | 10/2011 | Zhu et al. |
| 2011/0268033 A1 | 11/2011 | Boldi et al. |
| 2011/0274021 A1 | 11/2011 | He et al. |
| 2011/0281536 A1 | 11/2011 | Lee et al. |
| 2012/0134328 A1 | 5/2012 | Gauvreau et al. |
| 2012/0314797 A1 | 12/2012 | Kummetz et al. |
| 2013/0017792 A1 | 1/2013 | Miller, II |
| 2013/0017863 A1 | 1/2013 | Kummetz et al. |
| 2013/0051404 A1 | 2/2013 | Binder et al. |
| 2013/0058281 A1 | 3/2013 | Berlin et al. |
| 2013/0272463 A1* | 10/2013 | Uyehara ............ H04J 3/0685 375/356 |
| 2013/0279417 A1 | 10/2013 | Binder et al. |
| 2014/0024402 A1 | 1/2014 | Singh |
| 2014/0140225 A1 | 5/2014 | Wala |
| 2014/0146797 A1 | 5/2014 | Zavadsky et al. |
| 2014/0146905 A1 | 5/2014 | Zavadsky et al. |
| 2014/0146906 A1 | 5/2014 | Zavadsky et al. |
| 2014/0219267 A1* | 8/2014 | Eyuboglu ........... H04W 56/001 370/350 |
| 2014/0233666 A1* | 8/2014 | Campos ............... H04B 7/0413 375/267 |
| 2014/0269318 A1* | 9/2014 | Hasarchi ............. H04B 7/024 370/235 |
| 2014/0269859 A1 | 9/2014 | Hanson et al. |
| 2014/0293894 A1 | 10/2014 | Saban et al. |
| 2014/0314061 A1 | 10/2014 | Trajkovic et al. |
| 2015/0038185 A1 | 2/2015 | Saban et al. |
| 2015/0098351 A1 | 4/2015 | Zavadsky et al. |
| 2015/0098372 A1 | 4/2015 | Zavadsky et al. |
| 2015/0098419 A1 | 4/2015 | Zavadsky et al. |

FOREIGN PATENT DOCUMENTS

| | | |
|---|---|---|
| DE | 20317501 U1 | 1/2004 |
| EP | 0342858 A2 | 11/1989 |
| EP | 0355328 A2 | 2/1990 |
| EP | 0709974 A1 | 5/1996 |
| EP | 0938204 A1 | 8/1999 |
| EP | 1075109 A2 | 2/2001 |
| EP | 1085684 A2 | 3/2001 |
| EP | 1331762 A1 | 7/2003 |
| EP | 1347584 A2 | 9/2003 |
| EP | 1509002 A1 | 2/2005 |
| EP | 1553725 A1 | 7/2005 |
| EP | 1749399 A1 | 2/2007 |
| EP | 1954019 A1 | 8/2008 |
| EP | 2081334 A1 | 7/2009 |
| GB | 2266028 A | 10/1993 |
| GB | 2313020 A | 11/1997 |
| JP | 5252559 A | 9/1993 |
| JP | 5327569 A | 12/1993 |
| JP | 5327576 A | 12/1993 |
| KR | 20110087949 A | 8/2011 |
| WO | 9413067 A1 | 6/1994 |
| WO | 9603823 A1 | 2/1996 |
| WO | 9613102 A1 | 5/1996 |
| WO | 9748197 A2 | 12/1997 |
| WO | 9804054 A1 | 1/1998 |
| WO | 9854844 A1 | 12/1998 |
| WO | 0064106 A1 | 10/2000 |
| WO | 0180543 A2 | 10/2001 |
| WO | 0225920 A1 | 3/2002 |
| WO | 02065229 A2 | 8/2002 |
| WO | 02091618 A1 | 11/2002 |
| WO | 03024027 A1 | 3/2003 |
| WO | 2004068827 A1 | 8/2004 |
| WO | 2004107783 A1 | 12/2004 |
| WO | 2005022692 A2 | 3/2005 |
| WO | 2005083944 A1 | 9/2005 |
| WO | 2005109845 A1 | 11/2005 |
| WO | 2006052216 A1 | 5/2006 |
| WO | 2006094441 A1 | 9/2006 |
| WO | 2006105185 A2 | 10/2006 |
| WO | 2006136811 A1 | 12/2006 |
| WO | 2007069241 A2 | 6/2007 |
| WO | 2007075579 A2 | 7/2007 |
| WO | 2007133630 A2 | 11/2007 |
| WO | 2008076432 A1 | 6/2008 |
| WO | 2009053910 A2 | 4/2009 |
| WO | 2009100395 A1 | 8/2009 |
| WO | 2009100396 A1 | 8/2009 |
| WO | 2009100397 A2 | 8/2009 |
| WO | 2009100398 A2 | 8/2009 |
| WO | 2010087919 A2 | 8/2010 |
| WO | 2010090999 A1 | 8/2010 |
| WO | 2010127963 A2 | 11/2010 |
| WO | 2011043172 A1 | 4/2011 |
| WO | 2011112373 A1 | 9/2011 |
| WO | 2011160117 A1 | 12/2011 |
| WO | 2012024345 A2 | 2/2012 |
| WO | 2012054553 A1 | 4/2012 |

(56) References Cited

FOREIGN PATENT DOCUMENTS

| WO | 2012170865 A2 | 12/2012 |
|---|---|---|
| WO | 2013009835 A1 | 1/2013 |
| WO | 2013096563 A1 | 6/2013 |
| WO | 2014070236 A1 | 5/2014 |
| WO | 2014082070 A1 | 5/2014 |
| WO | 2014082072 A1 | 5/2014 |
| WO | 2014082075 A1 | 5/2014 |
| WO | 2014144314 A1 | 9/2014 |
| WO | 2015054162 A1 | 4/2015 |
| WO | 2015054164 A1 | 4/2015 |
| WO | 2015054165 A1 | 4/2015 |

OTHER PUBLICATIONS

Notification of Reexamination for Chinese patent application 200580014468.5 issued Apr. 24, 2013, 10 pages.
Translation of Notice of Grounds for Rejection for Japanese patent application 2011-548833 issued Feb. 25, 2014, 6 pages.
International Search Report and Written Opinion for PCT/US2013/033253 mailed Sep. 26, 2013, 11 pages.
Final Office Action for U.S. Appl. No. 12/674,680 mailed Apr. 25, 2014, 24 pages.
Notice of Allowance and Examiner-Initiated Interview Summary for U.S. Appl. No. 12/674,680 mailed Aug. 19, 2014, 10 pages.
Final Office Action for U.S. Appl. No. 13/664,013 mailed Jul. 15, 2014, 31 pages.
Non-final Office Action for U.S. Appl. No. 13/664,013 mailed Dec. 20, 2013, 30 pages.
Notice of Allowance for U.S. Appl. No. 13/664,013 mailed Dec. 22, 2014, 8 pages.
Notice of Allowance for U.S. Appl. No. 13/664,038 mailed Feb. 20, 2015, 8 pages.
Non-Final Office Action for U.S. Appl. No. 13/664,038 mailed Dec. 5, 2014, 6 pages.
Non-Final Office Action for U.S. Appl. No. 13/920,706, mailed Jun. 3, 2015, 20 pages.
Third Office Action for Chinese Patent Application No. 201210068309.5, mailed Apr. 3, 2015, 4 pages.
European Search Report issued Apr. 6, 2011 for European Patent Application No. 10182929.9, 7 pages.
European Search Report issued Apr. 5, 2011 for European Patent Application No. 10182930.7, 6 pages.
Author Unknown, "WaveLAN™ WL60040 Multimode Wireless LAN Media Access Controller (MAC)", Product Brief, Agere Systems Inc., Aug. 2003, pp. 1-10.
Author Unknown, "WaveLAN™ 802.11a/b/g Chip Set," Product Brief, Agere Systems Inc., Feb. 2003, pp. 1-6.
Author Unknown, "WaveLAN™ WL54040 Dual-Band Wireless LAN Transceiver", Product Brief, Agere Systems Inc., Sep. 2003, pp. 1-4.
Author Unknown, "ActiveLite Antenna," Publication SD-1107, Allen Telecom Group Inc., Dec. 1994, 6 pages.
Flenniken, "MicroFill Systems Engineering Design Guide," Publication SD-1131, Allen Telecom Group Inc., Jan. 1995, 12 pages.
Author Unknown, "MicroFILL, When You Have Customers in High Places, Low Places, Covered Places and Parking Places," Publication SD-1106, Allen Telecom Group Inc., Dec. 1994, 5 pages.
Author Unknown, "The Secret to MicroLite's Coverage Success," Publication SD-1115, Allen Telecom Group Inc., Jun. 1994, 4 pages.
Avery, "Standard Serves In-Building Microcellular PCS," Cellular Standard, Microwaves & RF, May 1995, 4 pages.
Author Unknown, "EIA 600.82 CAL Context Description," Revision SP3485, Revised Feb. 2, 1996, 17 pages.
Author Unknown, "EIA 600.81 Common Application Language (CAL) Specification," Revision SP3484, Revised Sep. 17, 1996, 77 pages.
Goldberg, Lee, "Broadband to the Home: Challenges on the Last Mile," Electronic Design Report, Electronic Design, Oct. 2, 1995, 9 pages.
Goldberg, Lee, "Brains and Bandwidth: Fiber Service at Copper Prices," Cover Feature, Electronic Design, Oct. 2, 1995, 5 pages.
Written Opinion of the International Searching Authority for PCT/US2009/048155 mailed Aug. 20, 2009, 10 pages.
Sanchez, et al. "A high performance, versatile residential gateway", IEEE Wireless Communications and Networking Conference, Sep. 23, 2000, pp. 560-565.
Rigge et al., "802.11 Wireless Chip Set Technology White Paper", Agere Systems Inc., Mar. 2003, pp. 1-12.
Dastangoo et al., "Wireless LAN Technologies and Applications," MILCOM '93 Conference Record, IEEE, Boston, Massachusetts, Oct. 11-14, 1993, vol. 2, pp. 497-501.
Author Unknown, "EIA 600.41 Description of the Data Link Layer," Revision IS-60, Jan. 31, 1996, 60 pages.
Author Unknown, "Draft IS-60.04 Node Communications Protocol; Part 6: Application Layer Specification," Draft Copy, Revised Apr. 18, 1996, 129 pages.
Author Unknown, "EIA-600.10 Introduction to the CEBus Standard," Draft Copy, SP-3531, Revision Feb. 5, 1995, 19 pages.
Author Unknown, "Ethernet Wireless LAN System," What's New Section, BYTE Magazine, Feb. 1996, pp. 1, 5, 203.
Evans, G., "The CEBus Standard User's Guide: A Complete Technical Overview," First Edition, Grayson Evans, May 1996, 316 pages.
Dettmer, R., "GSM Over Ethernet," Data Cabling, IEE Review, Mar. 2002, pp. 37-40.
Hachman, M., "Compaq to Ride The CEBus," EBN, Jan. 22, 1996, 1 page.
Trowbridge, D., "High Cost of Wiring Sparks Wireless LAN Alternatives," Computer Technology Review, vol. XIV, No. 3, Mar. 1994, 8 pages.
Hoffman, J., "Cable,Television and the Consumer Electronic Bus," The International TV Symposium, Montreux, Switzerland, Jun. 11, 1987, Panasonic Technologies, Inc., pp. 165-173.
Strassberg, D., "Home Automation Buses: Protocols Really Hit Home," Design Feature, EDN, Apr. 13, 1995, 9 pages.
Author Unknown, "54 Mbps IEEE 802.11 Wireless LAN at 2.4 GHz", White Paper, Nov. 2002, Intel Corporation, 8 pages.
Author Unknown, "JVC Introduces Ethernet Compatible Wireless LAN System," Business Wire, Inc., Sep. 26, 1995, 1 page.
Author Unknown, "JVC Introduces First Ethernet Compatible Wireless LAN System," Business Wire, Inc., Nov. 7, 1995, 1 page.
Author Unknown, "JVC Node," Technical Specifications, JVC Web Site, Accessed Jan. 18, 2007, 2 pages.
Author Unknown, "JVC PC Card & Mobile," Technical Specifications, JVC Web Site, Accessed Jan. 18, 2007, 2 pages.
Author Unknown, "JVC Power Hub," Technical Specifications, JVC Web Site, Accessed Jan. 18, 2007, 1 page.
Author Unknown, "JVC Satellite," Technical Specifications, JVC Web Site, Accessed Jan. 18, 2007, 2 pages.
Author Unknown, "JVC T-Adapter," Technical Specifications, JVC Web Site, Accessed Jan. 18, 2007, 1 page.
Author Unknown, "VIPSLAN-10; An Introduction," JVC, Sep. 1995, 11 pages.
Author Unknown, "High Isolation-Surface Mount: Pin Diode Switches (Modules)," Series SWX, MCE, KDI Integrated Products, Nov. 5, 2002, Whippany, New Jersey, pp. 1-2.
Markwalter, B. E. et al., "CEBus Router Testing," IEEE Transactions on Consumer Electronics, Nov. 1991, vol. 37, No. 4, 8 pages.
Author Unknown, "Maxim MAX9993 High Linearity 1700 MHz to 2200MHz Down-Conversion Mixer with LO Buffer/Switch", Maxim Integrated Products, Oct. 2002, pp. 1-12.
Author Unknown, "Maxim MAX2450 3V, Ultra-Low-Power Quadrature Modulator/Demodulator," Maxim Integrated Products, Sep. 1998, pp. 1-8.
Author Unknown, "EIA 600.42 Node Medium Access Control Sublayer," Revision IS-60, Feb. 22, 1996, 54 pages.
Ophir et al., "802.11 Over Coax—A Hybrid Coax—Wireless Home Networking Using 802.11 Technology," Consumer Communications and Networking Conference, IEEE, Jan. 2004, 6 pages.
Elmirghani, J., "Optical Wireless Systems and Networks," IEEE Communications Magazine, IEEE, vol. 36, No. 12, Dec. 1998, pp. 70-71.

(56) References Cited

OTHER PUBLICATIONS

Pahlavan, et al., "Trends in Local Wireless Networks," IEEE Communications Magazine, IEEE, Issue 3, vol. 33, Mar. 1995, pp. 88-95.
Author Unknown, "EIA-600.38 Power Line/RF Symbol Encoding Sublayer," SP-3483, Revision May 12, 1995, Draft Copy, 64 pages.
Author Unknown, "Wireless Remote Controls," Powerhouse Web Site, Accessed Apr. 5, 2005, 3 pages.
Author Unknown, "Wireless Wall Switches," Powerhouse Web Site, Accessed Apr. 5, 2005, 3 pages.
Author Unknown, "EIA-600.35—RF Physical Layer & Medium Specification," Revision: IS-60, Aug. 30, 1995, 17 pages.
International Preliminary Report on Patentability for PCT/IL2005/000111 mailed Jun. 30, 2006 5 pages.
International Search Report for PCT/IL2005/000111 mailed Jun. 6, 2005, 3 pages.
Translation of Notification of Grounds for Refusal for Korean patent application 10-2006-7025374 mailed May 25, 2011, 2 pages.
Translation of Notification of Grounds for Refusal for Korean patent application 10-2012-7016573 mailed Oct. 23, 2012, 6 pages.
Translation of Official Notice for Filing Response for Korean patent application 10-2012-7016573 mailed Apr. 19, 2013, 2 pages.
Translation of Official Notice for Filing Response for Korean patent application 10-2012-7033432 mailed Apr. 19, 2013, 2 pages.
Translation of Decision on Rejection for Chinese patent application 201110035156.X mailed Aug. 30, 2013, 8 pages.
Official Notice for Filing Response for Korean patent application 10-2006-7025374 mailed Oct. 23, 2013, 6 pages.
Author Unknown, "2441.8 MHz SAW Filter," Preliminary Data Sheet, Part No. 855916, Revision C, Sawtek (A TriQuint company), Oct. 13, 2005, Orlando, Florida, USA, pp. 1-5.
Author Unknown, "SMSC LAN91C111: 10/100 Non-PCI Ethernet Single Chip MAC+PHY", Datasheet, Revision 1.92, SMSC, Jun. 27, 2011, pp. 1-133.
Author Unknown, "EIA-600.37 Symbol Encoding Sublayer," SP-3482, Revised May 12, 1995, Draft Copy, 30 pages.
Author Unknown, "Low Power Advantage of 802.11a/g vs. 802.11b", White Paper, SPLY006, Dec. 2003, Texas Instruments Incorporated, pp. 1-10.
Author Unknown, "T83027 PLL Clock Generator IC with VCXO," Product Specifications, TLSI Incorporated, Jul. 18, 2005, Huntington, NY, USA, pp. 1-6.
Zyren, J. et al., "IEEE 802.11g Offers Higher Data Rates and Longer Range", Intersil Americas LLC, Mar. 2003, pp. 1-15.
Clegg, "VIPSLAN-10 Streaks Off the Wire," Preview, LAN Times, Dec. 18, 1995, 1 page.
Author Unknown, "VISPLAN-10: The First Ethernet-Compatible Infrared Wireless LAN System," Application Guide, JVC, May 1996, 10 pages.
Zeino, et al., "Functional Approach to a Hybrid Wireless Network for Mobile Stations," 5th IEEE International Symposium on Personal, Indoor, and Mobile Radio Communications, Sep. 18-23, 1994, vol. 3, pp. 994-998.
Author Unknown, "Super G: Maximizing Wireless Performance", White Paper, Document No. 991-00006-001, Atheros Communications, Inc., Mar. 2004, 20 pages.
Author Unknown, "JVC Station," Technical Specifications, JVC Web Site, Accessed Jan. 18, 2007, 2 pages.

\* cited by examiner

FREQUENCY SHIFTING A COMMUNICATIONS SIGNAL(S) IN A MULTI-FREQUENCY DISTRIBUTED ANTENNA SYSTEM (DAS) TO AVOID OR REDUCE FREQUENCY INTERFERENCE

CROSS-REFERENCE TO RELATED APPLICATION

This is a continuation application of U.S. patent application Ser. No. 14/496,349 filed on Sep. 25, 2014, the content of which is relied upon and incorporated herein by reference in its entirety, and the benefit of priority under 35 U.S.C. §120 is hereby claimed.

BACKGROUND

The technology of the present disclosure relates generally to distributed antenna systems (DASs), and more particularly to frequency shifting a communications signal(s) in a multiple frequency (multi-frequency) DAS to avoid or reduce potential frequency band interference, such as due to out-of-band harmonics generated by non-linearities in signal processing components.

Wireless communication is rapidly growing, with ever-increasing demands for high-speed mobile data communication. As an example, local area wireless services (e.g., so-called "wireless fidelity" or "WiFi" systems) and wide area wireless services are being deployed in many different types of areas (e.g., coffee shops, airports, libraries, etc.). Distributed communications or antenna systems communicate with wireless devices called "clients," "client devices," or "wireless client devices," which must reside within the wireless range or "cell coverage area" in order to communicate with an access point device. Distributed antenna systems are particularly useful to be deployed inside buildings or other indoor environments where client devices may not otherwise be able to effectively receive radio-frequency (RF) signals from a source, such as a base station for example. Example applications where distributed antenna systems can be used to provide or enhance coverage for wireless services include public safety, cellular telephony, wireless local access networks (LANs), location tracking, and medical telemetry inside buildings and over campuses.

One approach to deploying a distributed antenna system involves the use of RF antenna coverage areas, also referred to as "antenna coverage areas." Antenna coverage areas can be formed by remotely distributed antenna units, also referred to as remote units (RUs). The remote units each contain or are configured to couple to one or more antennas configured to support the desired frequency(ies) or polarization to provide the antenna coverage areas. Antenna coverage areas can have a radius in the range from a few meters up to twenty meters as an example. Combining a number of remote units creates an array of antenna coverage areas. Because the antenna coverage areas each cover small areas, there typically may be only a few users (clients) per antenna coverage area. This arrangement generates a uniform high quality signal enabling high throughput supporting the required capacity for the wireless system users.

As an example, FIG. 1 illustrates distribution of communications services to coverage areas 10(1)-10(N) of a DAS 12, wherein 'N' is the number of coverage areas. These communications services can include cellular services, wireless services such as RFID tracking, Wireless Fidelity (WiFi), local area network (LAN), WLAN, and combinations thereof, as examples. The coverage areas 10(1)-10(N) may be remotely located. In this regard, the remote coverage areas 10(1)-10(N) are created by and centered on remote antenna units 14(1)-14(N) connected to a central unit 16 (e.g., a head-end controller or head-end unit). The central unit 16 may be communicatively coupled to a base station 18. If the DAS 12 is a broadband DAS, the central unit 16 receives downlink communications signals 20D in multiple frequency bands for different communications services from the base station 18 to be distributed to the remote antenna units 14(1)-14(N). The remote antenna units 14(1)-14(N) are configured to receive downlink communications signals 20D from the central unit 16 over a communications medium 22 to be distributed as downlink communications signals 20D to the respective coverage areas 10(1)-10(N) of the remote antenna units 14(1)-14(N). Each remote antenna unit 14(1)-14(N) may include an RF transmitter/receiver (not shown) and a respective antenna 24(1)-24(N) operably connected to the RF transmitter/receiver to wirelessly distribute the communications services to client devices 26 within their respective coverage areas 10(1)-10(N).

With continuing reference to FIG. 1, the remote antenna units 14(1)-14(N) in the DAS 12 are also configured to receive uplink communications signals 20U in multiple frequency bands from the client devices 26 in their respective coverage areas 10(1)-10(N). The uplink communications signals 20U received in multiple frequency bands can be routed to different uplink path circuits (not shown) in the remote antenna units 14(1)-14(N) related to their frequency band. At the related uplink path circuits in the remote antenna units 14(1)-14(N), the uplink communications signals 20U can be filtered, amplified, and combined together into the combined uplink communications signals 20U to be distributed to the central unit 16. The central unit 16 can separate out the received combined uplink communications signals 20U into their respective bands to distribute to the base station 18.

Interference of downlink communications signals 20D and/or uplink communications signals 20U may occur in the DAS 12 due to non-linear signal processing components provided therein. For example, in the broadband DAS 12 in FIG. 1, signals in a frequency band of a given downlink communications signal 20D received and processed by a non-linear signal processing component in the central unit 16 may be duplicated as harmonics in other frequency bands falling within frequency bands of other received downlink communications signals 20D. For example, an 1800 MHz harmonic may be generated from a 900 MHz downlink communications signal 20D. Thus, when the downlink communications signals 20D in their respective frequency bands are combined in the central unit 16 to be distributed to the remote antenna units 14(1)-14(N), any harmonics generated from downlink communications signals 20D may interfere with other downlink communications signals 20D when combined. Similarly, when received uplink communications signals 20U are combined in a remote antenna unit 14(1)-14(N) to be distributed to the central unit 16, any harmonics generated from received uplink communications signals 20U may interfere with other uplink communications signals 20U when combined. Limiting input power to signal processing components is one method of limiting or avoiding harmonics caused by non-linearity. However, limiting input power can limit dynamic range of the DAS 12 in an undesired manner.

No admission is made that any reference cited herein constitutes prior art. Applicant expressly reserves the right to challenge the accuracy and pertinency of any cited documents.

SUMMARY

Embodiments disclosed herein include frequency shifting a communications signal(s) in a multiple frequency (multi-frequency) distributed antenna system (DAS) to avoid or reduce frequency interference. Related devices, methods, and DASs are also disclosed. Non-limiting examples of frequency interference include frequency band interference and frequency channel interference. For example, frequency interference in a multi-frequency DAS may result from non-linearity of a signal processing component generating an out-of-band harmonic of a first, in-use communications signal in a first frequency band, within different frequency band(s) of other in-use communications signal(s). Thus, to avoid or reduce such interference, certain embodiments involve predicting frequency interference that may result in an in-use communications signal(s) (the "predicted interfered communications signal(s)") as a result of an interfering signal product(s) produced from processing another in-use communications signal in another frequency (the "interference producing communications signal"). If frequency interference is predicted to occur, the frequency of the interference producing communications signal can be shifted in frequency, to in turn shift the frequency of the interfering signal product(s) to appear outside of the frequency of the predicted interfered communications signal(s). Alternatively, or in addition, the frequency of the predicted interfered communications signal(s) can be shifted so that the new, shifted frequency of the predicted interfered communications signal(s) is outside of the frequency of interfering signal product(s). In this manner, as a non-limiting example, frequency interference from any interfering signal products produced as a result of processing in-use communications signals is reduced or avoided, which may allow for higher signal-to-noise ratios (SNR) without having to limit input power. Further, as another example, frequency interference from interference producing communications signals received by antennas in the DAS can also be reduced or avoided.

One embodiment of the disclosure relates to a frequency interference prediction system in a multiple frequency (multi-frequency) distributed antenna system (DAS). The frequency interference prediction system comprises a communications signal interface, comprising a first communications signal interface configured to receive at least one first communications signal in at least one first frequency range, and a second communications signal interface configured to receive at least one second communications signal in at least one second frequency range different from the at least one first frequency range. The frequency interference prediction system also comprises a first communications signal path communicatively coupled to the first communications signal interface. The first communications signal path comprises a first frequency shifting circuit configured to frequency shift the at least one first communications signal from a first frequency in the at least one first frequency range to a shifted first communications signal at a shifted first frequency based on a first frequency control signal. The frequency interference prediction system also comprises a second communications signal path communicatively coupled to the second communications signal interface and configured to provide the at least one second communications signal as an output second communications signal to a second communications signal path output. The frequency interference prediction system also comprises a combiner communicatively coupled to a first communications signal path output and the second communications signal path output, the combiner configured to combine an output first communications signal and the output second communications signal into a combined multi-frequency communications signal. The frequency interference prediction system also comprises a controller. The controller is configured to predict frequency interference in the combined multi-frequency communications signal. If frequency interference is predicted in the combined multi-frequency communications signal, the controller is further configured to determine the shifted first frequency to shift the at least one first communications signal in the combined multi-frequency communications signal and set the at least one first frequency control signal to cause the first frequency shifting circuit to frequency shift the at least one first communications signal to the shifted first communications signal at the shifted first frequency.

Another embodiment of the disclosure relates to a method of avoiding or reducing frequency interference in a multi-frequency DAS. The method comprises receiving at least one first communications signal in at least one first frequency range in a first communications signal path comprising a first communications signal path output. The method also comprises receiving at least one second communications signal in at least one second frequency range different from the at least one first frequency range in a second communications signal path comprising a second communications signal path output. The method also comprises predicting frequency interference in a combined multi-frequency communications signal comprising the at least one first communications signal combined with the at least one second communications signal, as a result of an interfering signal product produced as a result of signal processing at least one of the at least one first communications signal and the at least one second communications signal. If frequency interference is predicted in the combined multi-frequency communications signal, the method also comprises determining a shifted first frequency to shift the at least one first communications signal in the combined multi-frequency communications signal, frequency shifting the at least one first communications signal to a shifted first communications signal at the shifted first frequency, and providing the shifted first communications signal as an output first communications signal to the first communications signal path output. The method also comprises combining the first communications signal path output and the second communications signal path output to provide the combined multi-frequency communications signal.

Another embodiment of the disclosure relates to a multi-frequency DAS. The multi-frequency DAS comprises a central unit. The central unit is configured to receive a combined uplink multi-frequency communications signal from a plurality of remote units. The central unit is also configured to receive a first downlink communications signal in at least one first frequency range and a second downlink communications signal in at least one second frequency range different from the at least one first frequency range. The central unit is also configured to distribute the first downlink communications signal as an output first downlink communications signal to a first downlink communications signal path output and the second downlink communications signal as an output second downlink communications signal to a second downlink communications signal path output. The central unit comprises a combiner communicatively coupled to the first downlink communications signal path output and the second downlink communications signal path output, the combiner configured to combine the output first downlink communications signal and the output second downlink communications signal into a combined downlink multi-frequency communications signal.

The multi-frequency DAS also comprises a plurality of remote units. Each remote unit among the plurality of remote units is configured to receive the combined downlink multi-frequency communications signal from the central unit and distribute the combined downlink multi-frequency communications signal from the central unit to at least one client device. Each remote unit among the plurality of remote units is also configured to receive a first uplink communications signal in at least one first frequency range and a second uplink communications signal in at least one second frequency range different from the at least one first frequency range. Each remote unit among the plurality of remote units is also configured to distribute the first uplink communications signal as an output first uplink communications signal to a first uplink communications signal path output and the second uplink communications signal as an output second uplink communications signal to a second uplink communications signal path output. Each remote unit among the plurality of remote units comprises a combiner communicatively coupled to the first uplink communications signal path output and the second uplink communications signal path output, the combiner configured to combine the output first uplink communications signal and the output second uplink communications signal into the combined uplink multi-frequency communications signal.

The multi-frequency DAS also comprises a frequency interference prediction system. The frequency interference prediction system comprises a first communications signal path. The first communications signal path comprises a first frequency shifting circuit configured to frequency shift at least one first communications signal among the first downlink communications signal and the first uplink communications signal from a first frequency to a shifted first communications signal at a shifted first frequency based on a first frequency control signal. The frequency interference prediction system also comprises a second communications signal path communicatively configured to provide a second communications signal among the second downlink communications signal and the second uplink communications signal as an output second communications signal to a second communications signal path output among the second downlink communications signal path output and the second uplink communications signal path output. The frequency interference prediction system also comprises a controller. The controller is configured to predict frequency interference in a combined multi-frequency communications signal among the combined downlink multi-frequency communications signal and the combined uplink multi-frequency communications signal. If frequency interference is predicted in the combined multi-frequency communications signal, the controller is further configured to determine the shifted first frequency to shift the at least one first communications signal in the combined multi-frequency communications signal and set the first frequency control signal to cause the first frequency shifting circuit to frequency shift the at least one first communications signal to the shifted first communications signal at the shifted first frequency.

Additional features and advantages will be set forth in the detailed description which follows. Both the foregoing general description and the following detailed description are merely exemplary, and are intended to provide an overview or framework to understand the nature and character of the claims. The drawings provide a further understanding and are part of this specification. The drawings illustrate one or more embodiment(s), and together with the description serve to explain the principles and operation of the various embodiments.

DETAILED DESCRIPTION

Various embodiments will be further clarified by the following examples.

Embodiments disclosed herein include frequency shifting a communications signal(s) in a multiple frequency (multi-frequency) distributed antenna system (DAS) to avoid or reduce frequency interference. Related devices, methods, and DASs are also disclosed. Non-limiting examples of frequency interference include frequency band interference and frequency channel interference. For example, frequency interference in a multi-frequency DAS may result from non-linearity of a signal processing component generating an out-of-band harmonic of a first, in-use communications signal in a first frequency band, within different frequency band(s) of other in-use communications signal(s). Thus, to avoid or reduce such interference, certain embodiments involve predicting frequency interference that may result in an in-use communications signal(s) (the "predicted interfered communications signal(s)") as a result of an interfering signal product(s) produced from processing another in-use communications signal in another frequency (the "interference producing communications signal"). If frequency interference is predicted to occur, the frequency of the interference producing communications signal can be shifted in frequency, to in turn shift the frequency of the interfering signal product(s) to appear outside of the frequency of the predicted interfered communications signal(s). Alternatively, or in addition, the frequency of the predicted interfered communications signal(s) can be shifted so that the new, shifted frequency of the predicted interfered communications signal(s) is outside of the frequency of interfering signal product(s). In this manner, as a non-limiting example, frequency interference from any interfering signal products produced as a result of processing in-use communications signals is reduced or avoided, which may allow for higher signal-to-noise ratios (SNR) without having to limit input power. Further, as another example, frequency interference from interference producing communications signals received by antennas in the DAS can also be reduced or avoided.

Figure 3:
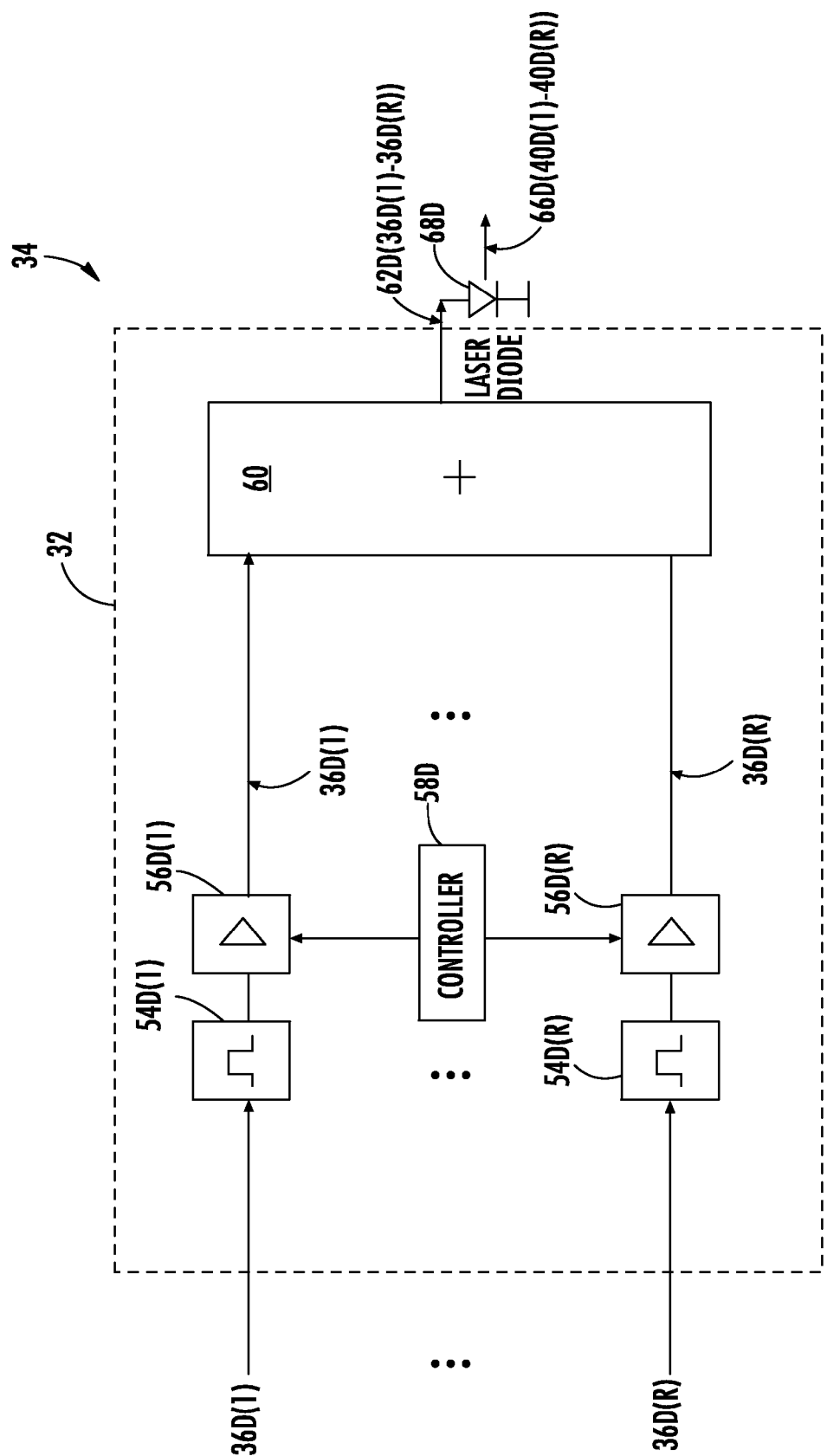
FIG. 3 is a schematic diagram of exemplary signal processing components in the multi-frequency DAS in FIG. 2 configured to process and combine multiple received communications signals in multiple frequencies into a combined multi-frequency communications signal, and convert the combined multi-frequency communications signal into a combined optical multi-frequency communications signal.
Figures 4A, 4B:
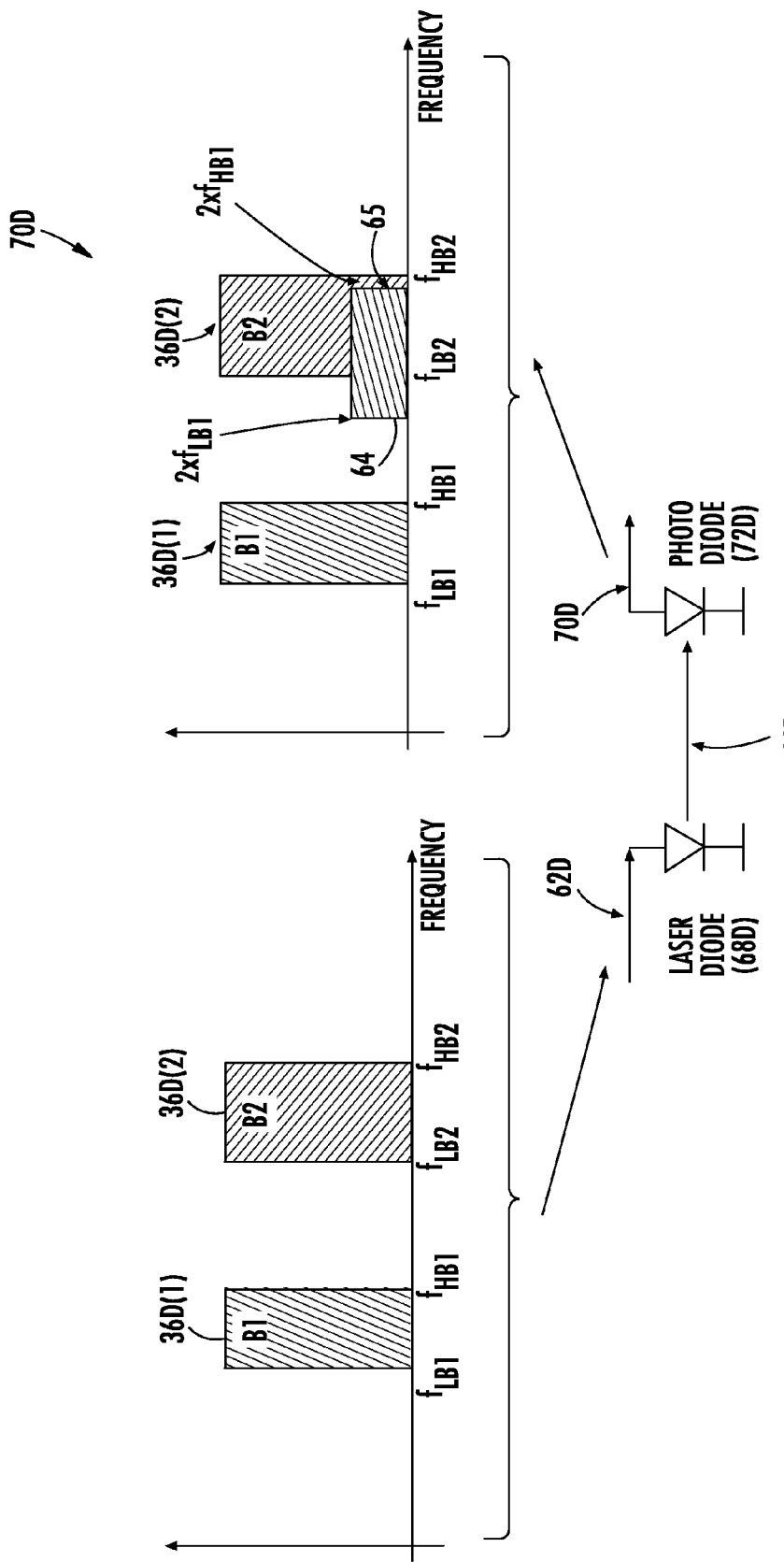
FIG. 4A is a graph illustrating different frequency bands in a combined multi-frequency communications signal in the multi-frequency DAS in FIG. 2 resulting from combining a first received in-use communications signal and a second received in-use communications signal having different frequency bands.
FIG. 4B is a graph illustrating an out-of-band interfering signal product of the first received in-use communications signal produced as a result of signal processing the first in-use communications signal, appearing in the frequency band of the second received in-use communications signal in a combined multi-frequency communications signal in the multi-frequency DAS in FIG. 2.
Figure 5A:
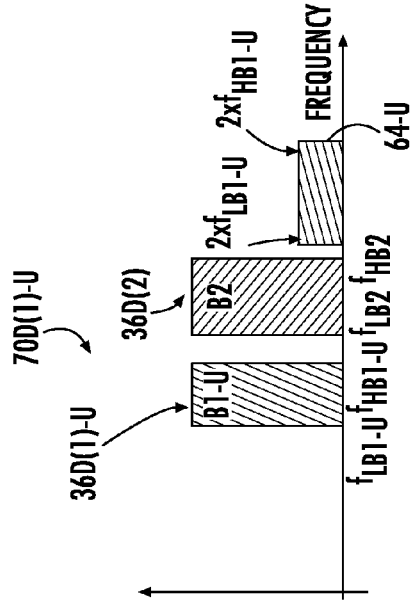
FIG. 5A is a graph illustrating the frequency band of the first in-use communications signal in FIG. 4A down frequency shifted to cause the corresponding out-of-band interfering signal product to be shifted in a combined multi-frequency communications signal, to avoid the out-of-base interfering signal product interfering with the frequency of the second in-use communications signal.

Before discussing examples of frequency shifting a communications signal in a multi-frequency DAS to avoid or reduce frequency interference starting at FIG. 5A, an exemplary DAS that does not involve frequency shifting to avoid or reduce frequency interference is first discussed with regard to FIGS. 2-4B.

Figure 1:
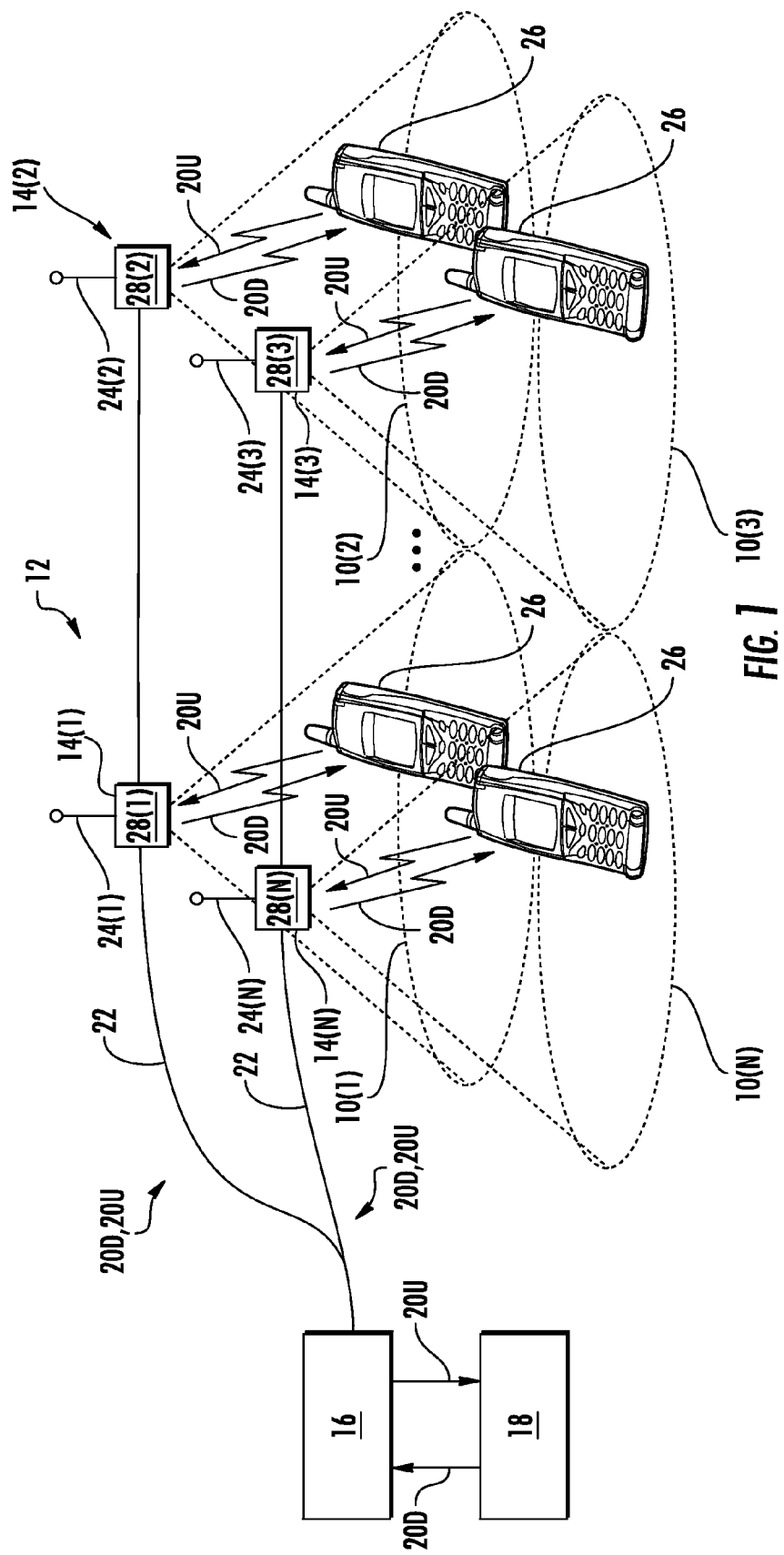
FIG. 1 is a schematic diagram of an exemplary distributed antenna system (DAS) capable of distributing radio frequency (RF) communications services to client devices.
Figure 2:
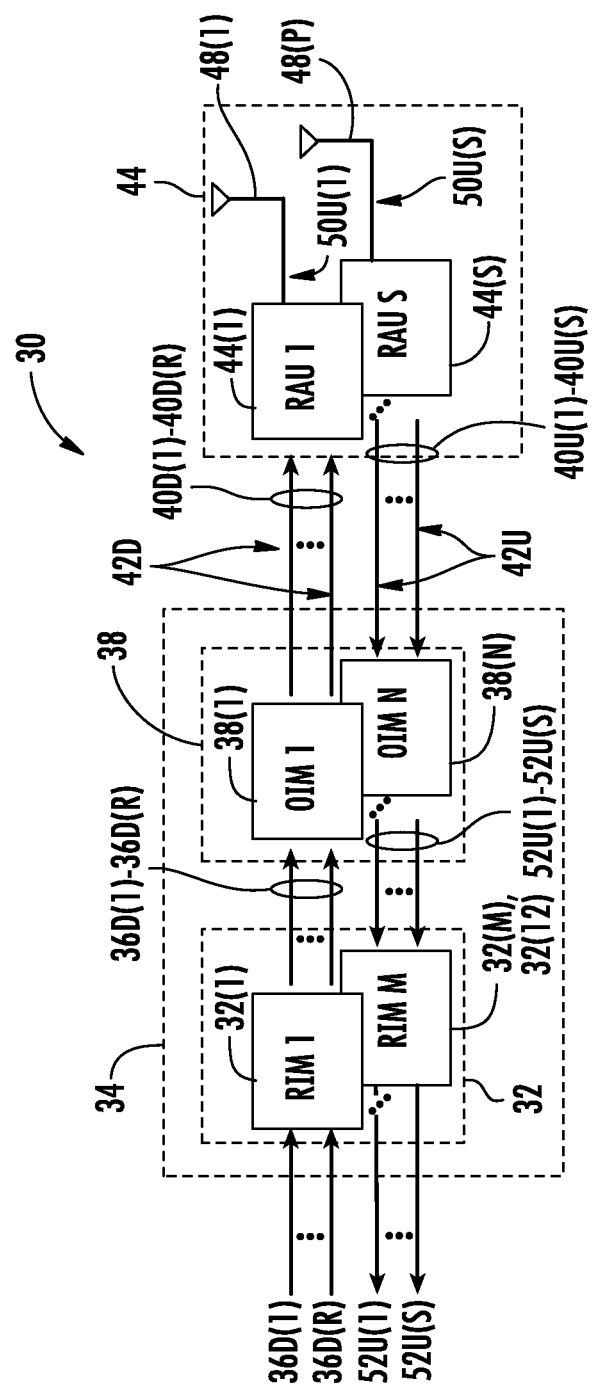
FIG. 2 is a schematic diagram of an exemplary multi-frequency DAS configured to distribute communications signals in multiple frequency bands.

In this regard, FIG. 2 is a schematic diagram of an exemplary multi-frequency optical fiber-based DAS 30 (hereinafter "multi-frequency DAS 30"). In this example, the multi-frequency DAS 30 includes optical fiber for distributing communications services for multiple frequency bands. The multi-frequency DAS 30 in this example is comprised of three (3) main components. One or more radio interfaces provided in the form of radio interface modules (RIMs) 32(1)-32(M) are provided in a central unit 34 to receive and process downlink electrical communications signals 36D(1)-36D(R) prior to optical conversion into downlink optical communications signals. The downlink electrical communications signals 36D(1)-36D(R) may be received from a base station (not shown) as an example. The RIMs 32(1)-32(M) provide both downlink and uplink interfaces for signal processing. The notations "1-R" and "1-M" indicate that any number of the referenced component, 1-R and 1-M, respectively, may be provided. The central unit 34 is configured to accept the plurality of RIMs 32(1)-32(M) as modular components that can easily be installed and removed or replaced in the central unit 34. In one embodiment, the central unit 34 is configured to support up to twelve (12) RIMs 32(1)-32(12). Each RIM 32(1)-32(M) can be designed to support a particular type of radio source or range of radio sources (i.e., frequencies) to provide flexibility in configuring the central unit 34 and the multi-frequency DAS 30 to support the desired radio sources. For example, one RIM 32 may be configured to support the Personal Communication Services (PCS) radio band. Another RIM 32 may be configured to support the 700 MHz radio band. In this example, by inclusion of these RIMs 32, the central unit 34 could be configured to support and distribute communications signals on both PCS and LTE 700 radio bands, as an example. RIMs 32 may be provided in the central unit 34 that support any frequency bands desired, including but not limited to the US Cellular band, Personal Communication Services (PCS) band, Advanced Wireless Services (AWS) band, 700 MHz band, Global System for Mobile communications (GSM) 900, GSM 1800, and Universal Mobile Telecommunication System (UMTS). The RIMs 32(1)-32(M) may also be provided in the central unit 34 that support any wireless technologies desired, including but not limited to Code Division Multiple Access (CDMA), CDMA200, 1xRTT, Evolution—Data Only (EV-DO), UMTS, High-speed Packet Access (HSPA), GSM, General Packet Radio Services (GPRS), Enhanced Data GSM Environment (EDGE), Time Division Multiple Access (TDMA), Long Term Evolution (LTE), iDEN, and Cellular Digital Packet Data (CDPD).

The RIMs 32(1)-32(M) may be provided in the central unit 34 that support any frequencies desired, including but not limited to US FCC and Industry Canada frequencies (824-849 MHz on uplink and 869-894 MHz on downlink), US FCC and Industry Canada frequencies (1850-1915 MHz on uplink and 1930-1995 MHz on downlink), US FCC and Industry Canada frequencies (1710-1755 MHz on uplink and 2110-2155 MHz on downlink), US FCC frequencies (698-716 MHz and 776-787 MHz on uplink and 728-746 MHz on downlink), EU R & TTE frequencies (880-915 MHz on uplink and 925-960 MHz on downlink), EU R & TTE frequencies (1710-1785 MHz on uplink and 1805-1880 MHz on downlink), EU R & TTE frequencies (1920-1980 MHz on uplink and 2110-2170 MHz on downlink), US FCC frequencies (806-824 MHz on uplink and 851-869 MHz on downlink), US FCC frequencies (896-901 MHz on uplink and 929-941 MHz on downlink), US FCC frequencies (793-805 MHz on uplink and 763-775 MHz on downlink), and US FCC frequencies (2495-2690 MHz on uplink and downlink).

With continuing reference to FIG. 2, the downlink electrical communications signals 36D(1)-36D(R) are provided to a plurality of optical interfaces provided in the form of optical interface modules (OIMs) 38(1)-38(N) in this embodiment to convert the downlink electrical communications signals 36D(1)-36D(R) into downlink optical communications signals 40D(1)-40D(R). The notation "1-N" indicates that any number of the referenced component 1-N may be provided. The OIMs 38 may be configured to provide one or more optical interface components (OICs) that contain optical to electrical (O/E) and electrical to optical (E/O) converters, as will be described in more detail below. The OIMs 38 support the radio bands that can be provided by the RIMs 32, including the examples previously described above.

The OIMs 38(1)-38(N) each include E/O converters to convert the downlink electrical communications signals 36D(1)-36D(R) into the downlink optical communications signals 40D(1)-40D(R). The downlink optical communications signals 40D(1)-40D(R) are communicated over downlink optical fiber communications medium 42D to a plurality of remote units 44(1)-44(S), which may be remote antenna units. The notation "1-S" indicates that any number of the referenced component 1-S may be provided. O/E converters provided in the remote units 44(1)-44(S) convert the downlink optical communications signals 40D(1)-40D(R) back into the downlink electrical communications signals 36D(1)-36D(R), which are provided to antennas 48(1)-48(S) in the remote units 44(1)-44(S) to client devices (not shown) in the reception range of the antennas 48(1)-48(S).

E/O converters are also provided in the remote antenna units 44(1)-44(S) to convert uplink electrical communications signals 50U(1)-50U(S) received from client devices (not shown) through the antennas 48(1)-48(S) into uplink optical communications signals 40U(1)-40U(S). The remote units 44(1)-44(S) communicate the uplink optical communications signals 40U(1)-40U(S) over an uplink optical fiber communications medium 42U to the OIMs 38(1)-38(N) in the central unit 34. The OIMs 38(1)-38(N) include 0/E converters that convert the received uplink optical communications signals 40U(1)-40U(S) into uplink electrical communications signals 52U(1)-52U(S), which are processed by the RIMs 32(1)-32(M) and provided as uplink electrical communications signals 52U(1)-52U(S). The central unit 34 may provide the uplink electrical communications signals 52U(1)-52U(S) to a base station or other communications system.

Note that the downlink optical fiber communications medium 42D and uplink optical fiber communications medium 42U connected to each remote antenna unit 44(1)-44(S) may be a common optical fiber communications medium, wherein for example, wave division multiplexing (WDM) may be employed to provide the downlink optical communications signals 40D(1)-40D(R) and the uplink optical communications signals 40U(1)-40U(S) on the same optical fiber communications medium.

Interference of the downlink electrical communications signals 36D(1)-36D(R) and/or the uplink electrical communications signals 50U(1)-50U(S) may occur in the multi-frequency DAS 30 in FIG. 2 due to non-linear signal processing components provided therein. For example, communications signals in a frequency band of a given downlink electrical communications signal 36D received and processed by a non-linear signal processing component in the central unit 34 may be duplicated as harmonics in other frequency bands falling within frequency bands of other received downlink electrical communications signals 36D. For example, FIG. 3 is a schematic diagram of exemplary signal processing components that can be provided in the central unit 34 in the multi-frequency DAS 30 in FIG. 2 to process the received downlink electrical communications signals 36D(1)-36D(R). As shown in FIG. 3, the received downlink electrical communications signals 36D(1)-36D(R) are filtered by respective filters 54D(1)-54D(R) and attenuated by respective gain control circuits 56D(1)-56D(R) under control of a controller 58D in the central unit 34. Interference, such as harmonics of the received downlink electrical communications signals 36D(1)-36D(R), may be generated as interfering signal products by the gain control circuits 56D(1)-56D(R) and/or the laser diode 68D due to non-linearity issues. Thus, when the resulting downlink electrical communications signals 36D(1)-36D(R) are provided to a combiner 60D that combines the downlink electrical communications signals 36D(1)-36D(R) into a combined multi-frequency communications signal to be provided to any remote units 44(1)-44(S) (see FIG. 2), any interfering signal products generated from downlink electrical communications signals 36D may interfere with other downlink electrical communications signals 36D when combined. In this example, the combined multi-frequency communications signal is combined downlink electrical multi-frequency communications signal 62D. Note that any non-linearity signal processing components located downstream of the combiner 60D may have a greater chance of producing interference in the combined downlink electrical multi-frequency communications signal 62D, because a greater number of frequencies may be included in the combined downlink electrical multi-frequency communications signal 62D.

For example, FIG. 4A illustrates an exemplary first downlink electrical communications signal 36D(1) centered between the lower frequency $f_{LB1}$ of the first frequency band B1 and the higher frequency $f_{HB1}$ of the first frequency band B1. FIG. 4A also illustrates an exemplary second downlink electrical communications signal 36D(2) centered between the lower frequency $f_{LB2}$ of the second frequency band B2 and the higher frequency $f_{HB2}$ of the second frequency band B2. FIG. 4B also illustrates the two downlink electrical communications signals 36D(1), 36D(2) in their respective frequency bands B1, B2 after being combined as combined downlink electrical multi-frequency communications signal 62D. However, the combined downlink electrical multi-frequency communications signal 62D also includes a second order harmonic frequency band 64 between $2xf_{LB1}$ and $2xf_{HB1}$ that may be generated as a signal product in the combined downlink electrical multi-frequency communications signal 62D as a result of the central unit 34 in FIG. 2 signal processing the first downlink electrical communications signals 36D(1). For example, the second order harmonic frequency band 64 between $2xf_{LB1}$ and $2xf_{HB1}$ may be generated at the laser diode 68D itself. To this end, FIG. 4B shows the combined downlink electrical multi-frequency communications signal 62D with the second harmonic interference 64 that might be generated at a gain control circuit(s) 56D(1)-56D(R), the laser diode 68D and/or the photodiode 72D. Thus, the second order harmonic frequency band 64 will appear in a combined downlink electrical multi-frequency communications signal 70D as a result of the photodiode 72 converting the combined downlink optical multi-frequency communications signal 66D to the combined downlink electrical multi-frequency communications signal 70D in a remote unit 44 (see also, FIG. 2). Thus, the second harmonic interference 64 may be generated in combined downlink electrical multi-frequency communications signal 62D, which is in turn provided in the combined downlink electrical multi-frequency communications signal 70D after being processed by the photodiode 72D, or only in combined downlink electrical multi-frequency communications signal 70D due to the non-linearity issues associated with the laser diode 68D and/or the photodiode 72D.

Thus, as shown in FIG. 4B, the second order harmonic frequency band 64 overlaps with and thus interferes with the second frequency band B2 in the combined downlink electrical multi-frequency communications signal 70D. In other words, the second order harmonic frequency band 64 is an interfering signal product 65 with the second downlink electrical communications signal 36D(2) in the combined downlink electrical multi-frequency communications signal 70D. Thus, when the combined downlink electrical multi-frequency communications signal 70D is further processed, the second downlink electrical communications signal 36D(2) will include distortions from such interference. Limiting input power of the first downlink electrical communications signal 36D(1) can limit the interference of the second order harmonic frequency band 64 and can reduce the amplitude of the second order harmonic frequency band 64, and thus the interference with the second downlink electrical communications signal 36D(2). However, limiting input power can reduce the dynamic range of the multi-frequency DAS 30 in an undesired manner.

Further, with continuing reference to FIG. 3, when the combined downlink electrical multi-frequency communications signal 62D is converted to a combined downlink optical multi-frequency communications signal 66D by a laser diode 68D in an OIM 38 (FIG. 2), interference may also be generated in combined downlink optical multi-frequency communications signal 66D due to any non-linearity issues in the laser diode 68D. The same interference issues from processing the downlink electrical communications signals 36D(1)-36D(R) in the central unit 34 can also occur when the downlink optical communications signals 40D(1)-40D(R) are processed by a remote unit 44 (FIG. 2). For example with reference to FIGS. 4A-4B, as discussed above, the second order harmonic frequency band 64 will appear in a combined downlink electrical multi-frequency communications signal 70D as a result of the photodiode 72 converting the combined downlink optical multi-frequency communications signal 66D to the combined downlink electrical multi-frequency communications signal 70D in a remote unit 44 (see also, FIG. 2). Again, limiting input power of the downlink electrical communications signals 36D(1)-36D(R) received by the central unit 34 processed by the signal processing components is one method of limiting or avoiding downlink interference caused by non-linearity.

In this regard, embodiments disclosed herein include frequency shifting a communications signal(s) in a multi-frequency DAS, such as multi-frequency DAS 30 in FIG. 2, to avoid or reduce frequency interference. Thus, to avoid or reduce such interference, certain embodiments involve predicting frequency interference that may result in an in-use communications signal(s) (the "predicted interfered communications signal(s)") as a result of an interfering signal product(s) produced from processing another in-use communications signal in another frequency (the "interference producing communications signal"). For example, FIGS. 5A-5D illustrate examples of shifting in-use communications signals with regard to the first and second downlink electrical communications signals 36D(1), 36D(2) in FIGS. 4A and 4B, to avoid or reduce such interference.

In the example of FIG. 5A, an in-use communications signal of the first downlink electrical communications signal 36D(1), as the interference producing communications signal, is down frequency shifted to a lower frequency as down-shifted first downlink electrical communications signal 36D(1)-D in down-shifted band B1-D between frequencies $f_{LB1-D}$ and $f_{HB1-D}$ from its original frequency band $f_{LB1}$ and $f_{HB1}$ shown in FIG. 4A. Thus, the second order harmonic frequency band 64 in FIG. 4A generated from the first downlink electrical communications signal 36D(1) is also down frequency shifted as down-shifted second order harmonic frequency band 64-D between frequencies $2xf_{LB1-D}$ and $2xf_{HB1-D}$ as shown in FIG. 5A. This avoids the down-shifted second order harmonic frequency band 64-D interfering with frequency range of band B2 of the second downlink electrical communications signal 36D(2) as an interfered communications signal in combined downlink electrical multi-frequency communications signal 62D(1)-D in FIG. 5A. By frequency range, it is meant a range of frequencies in which the frequency interference is determined to exist. As discussed in more detail below, a frequency range in which frequency interference is predicted and frequency shifting is performed to avoid or reduce such frequency interference, can be a frequency band, a frequency channel, another other frequency range, or even a single frequency.

Figure 5B:
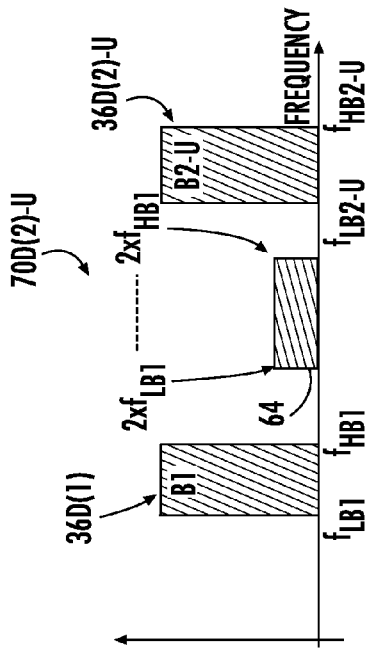
FIG. 5B is a graph illustrating the frequency band of the first in-use communications signal in FIG. 4A up frequency shifted to cause the corresponding out-of-band interfering signal product to be shifted in a combined multi-frequency communications signal, to avoid the out-of-base interfering signal product interfering with the frequency band of the second in-use communications signal.

Similarly in FIG. 5B, instead of down frequency shifting first downlink electrical communications signal 36D(1) to avoid interference of the second downlink electrical communications signal 36D(2), the first downlink electrical communications signal 36D(1) is up frequency shifted as up-shifted first downlink electrical communications signal 36D(1)-U to a higher frequency in up-shifted band B1-U between frequencies $f_{LB1-U}$ and $f_{HB1-U}$ from its original frequency band $f_{LB1}$ and $f_{HB1}$ shown in FIG. 4A. Thus, the second order harmonic frequency band 64 in FIG. 4A generated from the first downlink electrical communications signal 36D(1) is also up frequency shifted as up-shifted second order harmonic frequency band 64-U between frequencies $2xf_{LB1-U}$ and $2xf_{HB1-U}$ as shown in FIG. 5B. This avoids the up-shifted second order harmonic frequency band 64-U interfering with the frequency range of band B2 of the second downlink electrical communications signal 36D(2) as an interfered communications signal in combined downlink electrical multi-frequency communications signal 70D(1)-U in FIG. 5B.

Figure 5C:
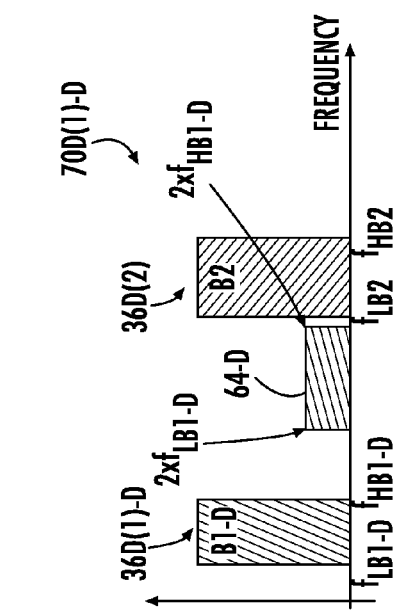
FIG. 5C is a graph illustrating the frequency band of the second in-use communications signal in FIG. 4A outside the frequency of the interfering signal product, as a result of up frequency shifting the second in-use communications signal, to avoid the interfering signal product interfering with the frequency band of the second in-use communications signal in the combined multi-frequency communications signal.

Also, in the example of FIG. 4A, the second downlink electrical communications signal 36D(2) could be shifted in lieu of, or in addition to, the first downlink electrical communications signal 36D(1), as the interfered communications signal to avoid interference with the second order harmonic frequency band 64 generated as a result of signal processing the first downlink electrical communications signal 36D(1). In this regard, in the example of FIG. 5C, an in-use communications signal of the second downlink electrical communications signal 36D(2), as the interfered communications signal, is down frequency shifted to a lower frequency as down-shifted second downlink electrical communications signal 36D(2)-D in down-shifted band B2-D between frequencies $f_{LB2-D}$ and $f_{HB2-D}$ from its original frequency band $f_{LB2}$ and $f_{HB2}$ shown in FIG. 4A. Thus, the second order harmonic frequency band 64 generated from processing the first downlink electrical communications signal 36D(1) between frequencies $2xf_{LB1}$ and $2xf_{HB1}$ does not overlap with down-shifted band B2-D of the down-shifted second downlink electrical communications signal 36D(2)-D, as shown in FIG. 5C. This avoids the second order harmonic frequency band 64 interfering with the frequency range of down-shifted band B2-D of the down-shifted second downlink electrical communications signal 36D(2)-D in combined downlink electrical multi-frequency communications signal 70D(2)-D in FIG. 5C.

Figure 5D:
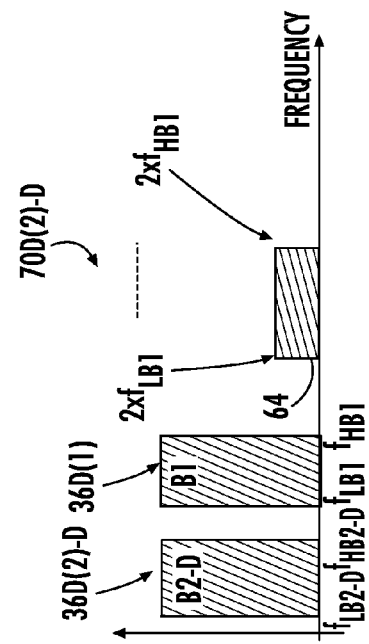
FIG. 5D is a graph illustrating the frequency band of the second in-use communications signal in FIG. 4A outside the frequency of the interfering signal product, as a result of down frequency shifting the second in-use communications signal, to avoid the interfering signal product interfering with the frequency band of the second in-use communications signal in the combined multi-frequency communications signal.

Similarly in FIG. 5D, instead of down frequency shifting second downlink electrical communications signal 36D(2) to avoid interference with the second order harmonic frequency band 64, the second downlink electrical communications signal 36D(2) is up frequency shifted as up-shifted second downlink electrical communications signal 36D(2)-U to a higher frequency in up-shifted band B2-U between frequencies $f_{LB2-U}$ and $f_{HB2-U}$ from its original frequency band $f_{LB2}$ and $f_{HB2}$ shown in FIG. 4A. Thus, the second order harmonic frequency band 64 in FIG. 4A generated from processing the first downlink electrical communications signal 36D(1) does not overlap up-shifted band B2-U of the up-shifted second downlink electrical communications signal 36D(2)-U, as shown in FIG. 5D. This avoids the second order harmonic frequency band 64 interfering with the frequency range up-shifted band B2-U of the down-shifted second downlink electrical communications signal 36D(2)-U in combined downlink electrical multi-frequency communications signal 70D(2)-U in FIG. 5D.

In either case of FIGS. 5A and 5B, as will be described in more detail below, the down-shifted first downlink electrical communications signal 36D(1)-D or the up-shifted first downlink electrical communications signal 36D(1)-U can be frequency shifted back to its original frequency before being communicated to its destination (e.g., an antenna of a remote unit in a DAS). Likewise, in either case of FIGS. 5C and 5D, as will be described in more detail below, the down-shifted second downlink electrical communications signal 36D(2)-D or the up-shifted second downlink electrical communications signal 36D(2)-U can be frequency shifted back to its original frequency before being communicated to its destination (e.g., antenna 48 of a remote unit 44 in the multi-frequency DAS 30 in FIG. 2). Further, although FIGS. 5A-5D illustrate examples of frequency shifting the first and second downlink electrical communications signal 36D(1)-36D(2), the same principles can be used to frequency shift uplink electrical communications signal 50U(1)-50U(S) in the multi-frequency DAS 30 in FIG. 2.

Figure 6:
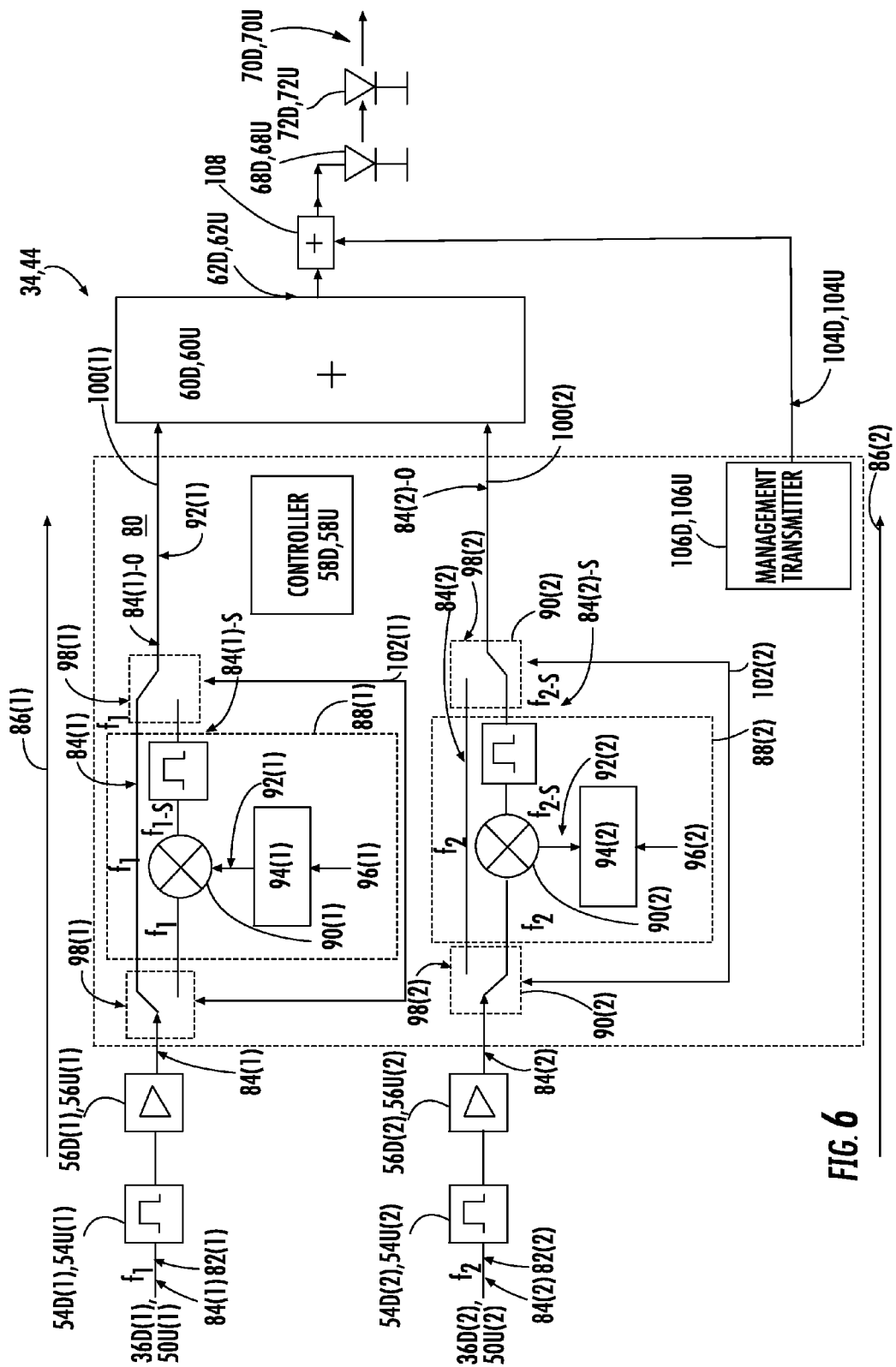
FIG. 6 is a schematic diagram of an exemplary frequency interference prediction system that can be provided in the multi-frequency DAS in FIG. 2, and is configured to predict frequency interference in combined multi-frequency communications signal resulting from an interfering signal product(s) produced from processing an in-use communications signal(s) provided in the combined multi-frequency communications signal, and perform frequency shifting of an in-use communications signal(s) to avoid or reduce interfering signal product interference.

To provide frequency shifting of in-use communications signals in the multi-frequency DAS 30 in FIG. 2 to avoid or reduce interference, a frequency interference prediction system can be provided therein to predict frequency interference in a combined multi-frequency communications signal and perform frequency shifting to avoid or reduce any predicted frequency interference. In this regard, FIG. 6 is a schematic diagram of an exemplary frequency interference prediction system 80 that can be provided in the multi-frequency DAS 30 in FIG. 2. As will be discussed in more detail below, the frequency interference prediction system 80 is configured to predict frequency interference in a combined multi-frequency communications signal resulting from an interfering signal product(s) produced from processing an in-use communications signal(s) provided in a combined multi-frequency communications signal 70D. For example, the combined multi-frequency communications signal may be combined downlink electrical multi-frequency communications signal 70D (see also, FIG. 3), or a combined uplink electrical multi-frequency communications signal 70U in a remote unit 44 (FIG. 2).

Note that the predicted frequency interference may be performed with regard to predicted interference of communications signals (i.e., data) located within particular channels if the channel frequencies in combined downlink electrical multi-frequency communications signal 70D are known. The predicted frequency interference may also be performed with regard to predicted interference of communications signals (i.e., data) located within particular frequency bands, typically over a greater frequency range than frequency channels. For example, the channel frequencies included within a combined downlink electrical multi-frequency communications signal 70D may not be known. Because typically, channel frequencies are more limited in bandwidth range than frequency bands in general, it may be more accurate to predict frequency channel interference than frequency band interference. However, as noted earlier, "frequency interference" encompasses at least both "frequency band interference and "frequency channel interference," without limitation.

The frequency interference prediction system 80 in FIG. 6 will now be described with regard to processing two (2) communications signals, which could be downlink electrical communications signals 36D(1), 36D(2) or uplink electrical communications signals 50U(1), 50U(2). However, note that frequency interference prediction system 80 is not limited to processing and providing frequency shifting to avoid interference with regard to only two (2) communications signals. Further, in FIG. 6, the notation 'D' designates downlink in the central unit 34 and 'U' designates uplink in a remote unit 44 in the multi-frequency DAS 30 in FIG. 2, as the frequency interference prediction system 80 can be provided in the central unit 34 for a downlink path and a remote unit 44 for an uplink path.

In this regard, as shown in FIG. 6, the example of the frequency interference prediction system 80 comprises a first communications signal interface 82(1) and a second communications signal interface 82(2). The first communications signal interface 82(1) is configured to receive a first communications signal 84(1) in a first frequency $f_1$, which in this example is either downlink electrical communications signal 36D(1) or uplink electrical communications signal 50U(1). The second communications signal interface 82(2) is configured to receive a second communications signal 84(2) as either downlink electrical communications signal 36D(2) or uplink electrical communications signal 50U(2), in a second frequency $f_2$ different from the first frequency $f_1$. A first communications signal path 86(1) is communicatively coupled to the first communications signal interface 82(1) to provide the received first communications signal 84(1) to optional filter 54D(1), 54U(1) and/or gain control circuit 56D(1), 56U(1) for signal processing. A second communications signal path 86(2) is communicatively coupled to the second communications signal interface 82(2) to provide the received second communications signal 84(2) to optional filter 54D(2), 54U(2) and/or gain control circuit 56D(2), 56U(2) for signal processing. Note that the first communications signal path 86(1) and the second communications signal path 86(2) could also include optional digital-to-analog converters (DACs) to convert the first and second communications signals 84(1), 84(2) from a digital format to an analog format before being filtered by filters 54D(1), 54D(2), if the first and second communications signals 84(1), 84(2) were received by the central unit 34 in digital format (e.g., in common public radio interface (CPRI) protocol) or converted to digital format in the central unit 34 before reaching the first communications signal path 86(1) and the second communications signal path 86(2).

With continuing reference to FIG. 6, a first frequency shifting circuit 88(1) is provided in the first communications signal path 86(1) to be able to frequency shift (down-shift or up-shift) the first communications signal 84(1) from its first frequency $f_1$ to a shifted first communications signal 84(1)-S at a shifted first frequency $f_{1-S}$ based on a first frequency control signal 96(1). The first frequency shifting circuit 88(1) in this example is comprised of a first mixer 90(1) that is configured to mix a first mixing frequency signal 92(1) generated by a first synthesizer 94(1) in response to the first frequency control signal 96(1). A first selector circuit 98(1) is also provided in the first communications signal path 86(1).

The first selector circuit 98(1) is configured to selectively provide the first communications signal 84(1) or the shifted first communications signal 84(1)-S as an output first communications signal 84(1)-O to a first communications signal path output 100(1) in response to a first selector control signal 102(1). In this manner, if it is desired to frequency shift the first communications signal 84(1) to avoid interference of the second communications signal 84(2), the shifted first communications signal 84(1)-S can be selected by the first selector circuit 98(1) through the first selector control signal 102(1) to be provided to the output first communications signal 84(1)-O to be provided to combiner 60D, 60U to be provided in the combined electrical multi-frequency communications signal 62D, 62U. The combiner 60D, 60U is communicatively coupled to the output first communications signal 84(1)-O. However, if it is not desired or needed to frequency shift the first communications signal 84(1) to avoid interference of the second communications signal 84(2), the first communications signal 84(1) can be selected by the first selector circuit 98(1) through the first selector control signal 102(1) to bypass the first frequency shifting circuit 88(1), or otherwise avoid frequency shifting, and be provided to the output first communications signal 84(1)-O to be provided to combiner 60D, 60U to be provided in the combined electrical multi-frequency communications signal 62D, 62U.

Similarly with continuing reference to FIG. 6, a second frequency shifting circuit 88(2) is provided in the second communications signal path 86(2) to be able to frequency shift (down-shift or up-shift) the second communications signal 84(2) from the second frequency $f_2$ to a shifted second communications signal 84(2)-S at a shifted second frequency $f_{2\text{-}S}$ based on a second frequency control signal 96(2). The second frequency shifting circuit 88(2) in this example is comprised of a second mixer 90(2) that is configured to mix a second mixing frequency signal 92(2) generated by a second synthesizer 94(2) in response to the second frequency control signal 96(2). A second selector circuit 98(2) is also provided in the second communications signal path 86(2). The second selector circuit 98(2) is configured to selectively provide the second communications signal 84(2) or the shifted second communications signal 84(2)-S as an output second communications signal 84(2)-O to a second communications signal path output 100(2) in response to a second selector control signal 102(2). In this manner, if it is desired to frequency shift the second communications signal 84(2) to avoid interference of the first communications signal 84(1), the shifted second communications signal 84(2)-S can be selected by the second selector circuit 98(2) through the second selector control signal 102(2) to be provided to the output second communications signal 84(2)-O to be provided to combiner 60D, 60U to be provided in the combined electrical multi-frequency communications signal 62D, 62U. The combiner 60D, 60U is communicatively coupled to the output second communications signal 84(2)-O. However, if it is not desired or needed to frequency shift the second communications signal 84(2) to avoid interference of the first communications signal 84(1), the second communications signal 84(2) can be selected by the second selector circuit 98(2) through the second selector control signal 102(2) to bypass the second frequency shifting circuit 88(2), or otherwise avoid frequency shifting, and be provided to the output second communications signal 84(2)-O to be provided to combiner 60D, 60U to be provided in the combined electrical multi-frequency communications signal 62D, 62U.

With continuing reference to FIG. 6, as previously discussed, it may be desired to frequency shift any shifted first communications signal 84(1)-S or shifted second communications signal 84(2)-S back to its original frequency. In this example, a synchronization control signal 104D, 104U that is used to synchronize (frequency and/or phase) the first and second frequency control signals 96(1), 96(2), can be combined in the combined electrical multi-frequency communications signal 62D, 62U, so that a recipient of the combined electrical multi-frequency communications signal 62D, 62U can use the synchronization control signal 104D, 106U to synchronize the reference signals used to mix with the first and/or second communications signals 84(1), 84(2) in the combined electrical multi-frequency communications signal 62D, 62U to convert the first and/or second communications signals 84(1), 84(2) back to their original frequencies $f_1$, $f_2$, respectively, or other frequency, as desired. In this regard, a management transmitter 106D, 106U may provide the synchronization control signal 104D, 104U to be added to the combined electrical multi-frequency communications signal 62D, 62U in adding component 108 in this example, which can then be filtered out of the combined electrical multi-frequency communications signal 62D, 62U in this example to be used for synchronization of return frequency conversions.

Figure 7:
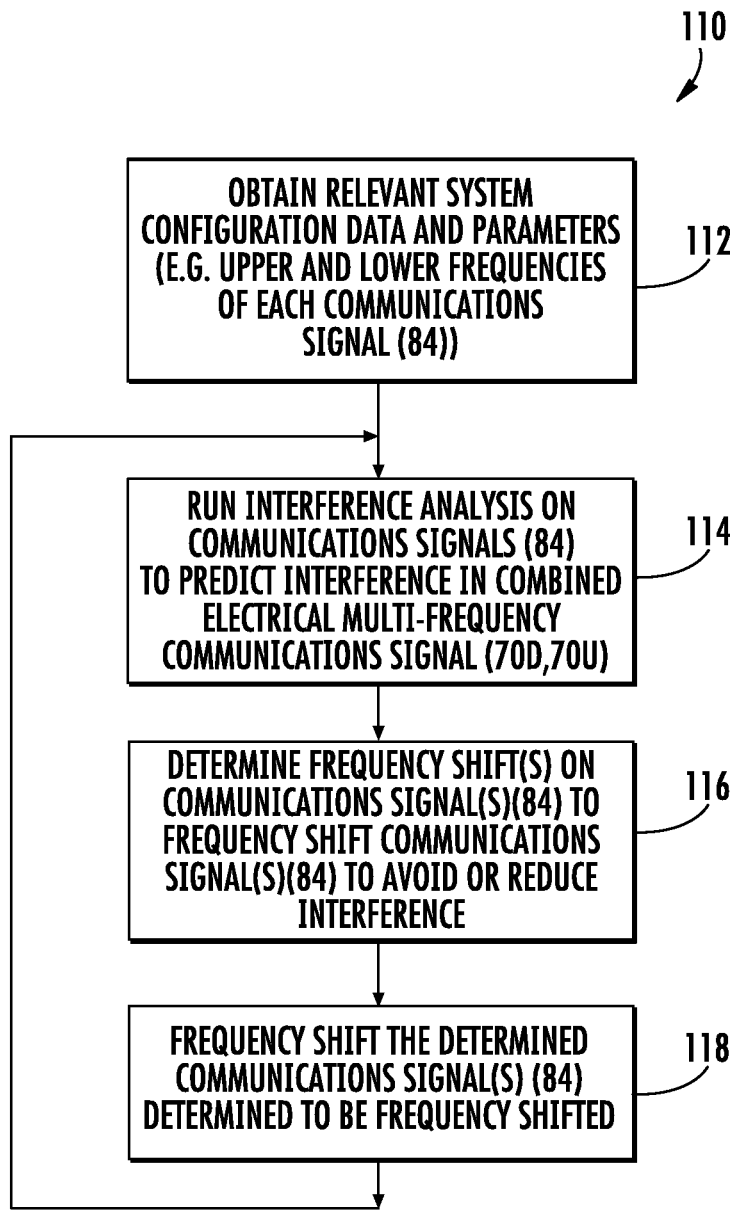
FIG. 7 is a flowchart illustrating an exemplary overall process that can be performed by the frequency interference prediction system in FIG. 6 to predict frequency interference in a combined multi-frequency communications signal resulting from an interfering signal product(s) produced from processing an in-use communications signal(s) provided in the combined multi-frequency communications signal, and frequency shift an in-use communications signal(s) to avoid or reduce interfering signal product interference.

With continuing reference to FIG. 6, in this embodiment of the frequency interference prediction system 80, a controller 58D, 58U is provided to control the frequency shifting decisions for the first and second communications signals 84(1), 84(2). In this regard, FIG. 7 is a flowchart of an exemplary process 110 of the controller 58D, 58U predicting potential interference in the combined electrical multi-frequency communications signal 70D, 70U and performing frequency shifting to avoid or reduce such interference. In this regard, the controller 58D, 58U may first obtain relevant system and configuration data of the multi-frequency DAS 30 to be used in predicting interference in the combined electrical multi-frequency communications signal 70D, 70U (block 112). Examples for possible system and configuration data could be in use frequency bands, detected wanted/unwanted uplink received signals, system/components linearity specifications, system input power, gain, output power, dynamic range, and/or sensitivity, etc. Next, the controller 58D, 58U predicts frequency interference in the combined electrical multi-frequency communications signal 70D, 70U based on an interference analysis performed on the communications signal 84 (block 114). The frequency interference predicted by the controller 58D, 58U could be frequency band interference or frequency channel interference if the channels included in communications signals 84 are known. If frequency interference is predicted in the combined electrical multi-frequency communications signal 62D, 62U, the controller 58D, 58U determines the frequency shifting to be performed on the communications signal(s) 84 combined in the combined electrical multi-frequency communications signal 70D, 70U to avoid or reduce potential interference in the combined electrical multi-frequency communications signal 70D, 70U (block 116). The controller 58D, 58U then frequency shifts the determined communications signal(s) 84 to be frequency shifted to avoid or reduce interference in the combined electrical multi-frequency communications signal 70D, 70U (block 118). For example, as discussed above, if the first communications signal 84(1) is to be frequency shifted, this step involves frequency shifting the first communications signal 84(1) in the first frequency shifting circuit 88(1) in FIG. 6 to the shifted first communications signal 84(1)-S and generating the first selector control signal 102(1) to cause the first selector circuit 98(1) to provide the shifted first communications signal 84(1)-S as the output first communications signal 84(1)-O to the first communications signal path output 100(1). The process 110 can be repeated, as shown in FIG. 7. Also as discussed above with regard to FIGS. 5A-5D, the communications signal 84 that results in an interfering signal product can be frequency shifted to frequency shift the interfering signal product, and/or other communications signal(s) 84 can be frequency shifted to avoid interfering with the interfering signal product.

Figure 8:
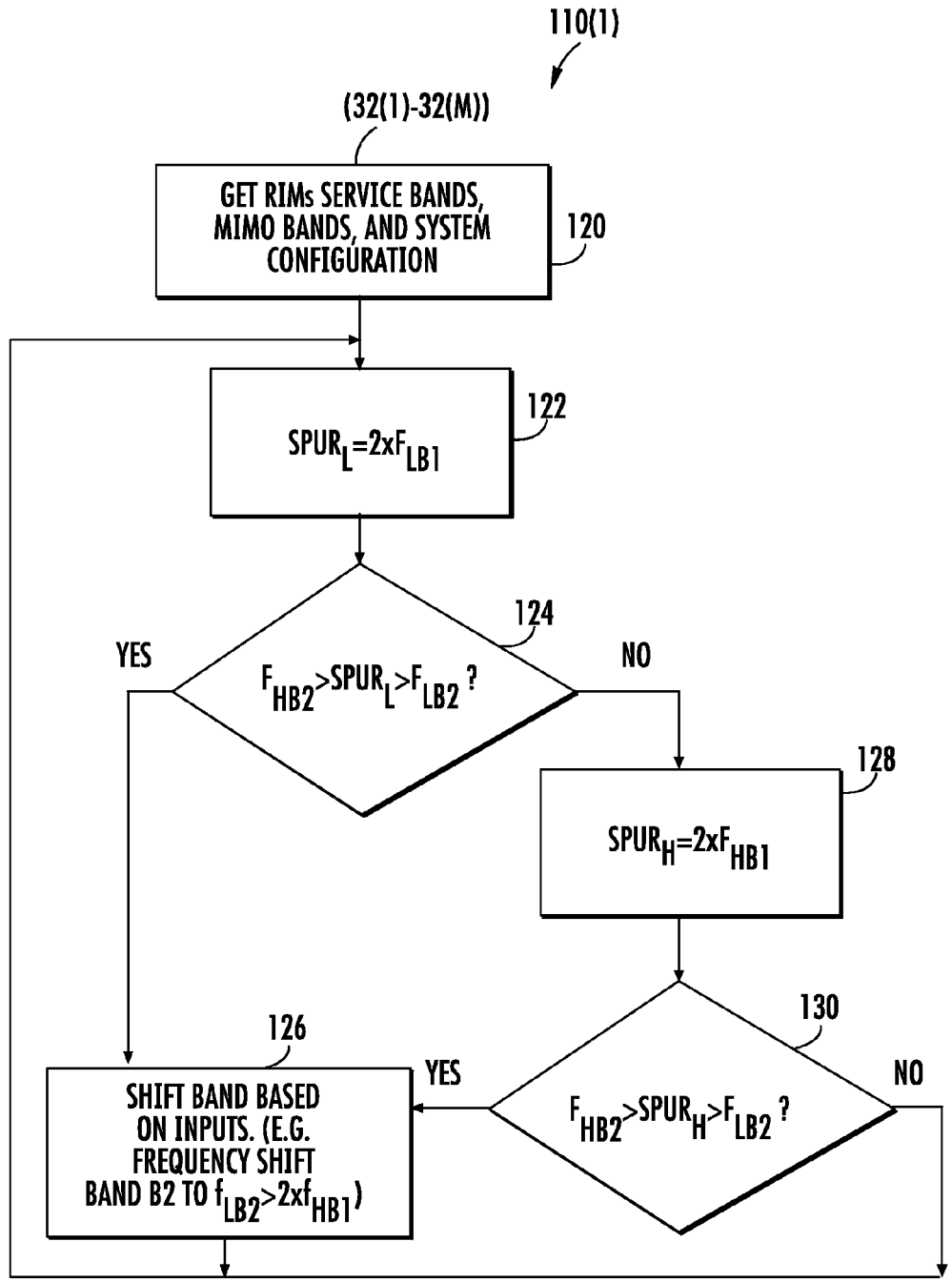
FIG. 8 is a flowchart illustrating a specific exemplary process of the process in FIG. 7 that can be performed by the frequency interference prediction system in FIG. 6 to predict frequency interference and frequency shifting of an in-use communications signal(s) to avoid or reduce frequency interference.

FIG. 8 is a flowchart illustrating a specific exemplary process 110(1) of the process 110 in FIG. 7 that can be performed by the frequency interference prediction system 80 in FIG. 6 to predict frequency interference and frequency shift an in-use communications signal(s) to avoid or reduce frequency interference. For example, the process 110(1) in FIG. 8 may be employed by the controller 58D, 58U in FIG. 6 to predict frequency band interference or frequency channel interference as a result of frequency band interference or frequency channel interference.

In this regard, with reference to FIG. 8, the exemplary process can be performed for a downlink path or an uplink path, which is discussed below with the designations 'D' for downlink and 'U' for uplink. In this regard, the controller 58D, 58U obtains the service frequency bands (or service frequency channels) supported by the RIMs 32(1)-32(M) and the system configuration of the multi-frequency DAS 30 (block 120). The controller 58D, 58U then calculates one or more low spurious interfering signal products ($SPUR_L$) generated from signal processing of the communications signals 36D or 50U in the multi-frequency DAS 30 (see FIG. 3) (block 122). In this example, the low spurious interfering signal products ($SPUR_L$) are generated from signal processing of the first downlink or uplink communications signals 36D(1) or 50U(1) using the example of a first and second downlink or uplink communications signals 36D(1), 36D(2) or 50U(1), 50U(2). For example, the calculated spurious interfering signal products may be harmonics of first downlink or uplink communications signals 36D(1) or 50U(1). In the example of block 122, the low spurious interfering signal product is calculated as the second order harmonic of the low frequency band or channel ($F_{LB1}$) of the first downlink or uplink communications signal 36D(1) or 50U(1), but such is not limiting.

With continuing reference to FIG. 8, the controller 58D, 58U then predicts frequency band interference (or frequency channel interference) in the combined downlink or uplink electrical multi-frequency communications signal 62D, 62U based on the low spurious interfering signal product ($SPUR_L$) falling between the low and high frequency bands ($F_{LB2}$ and $F_{HB2}$) (or frequency channels) of the second downlink or uplink communications signal 36D(2), 50U(2) (block 124). If the low spurious interfering signal product ($SPUR_L$) falls between the low and high frequency bands ($F_{LB2}$ and $F_{HB2}$) (or low and high frequency channels) of the second downlink or uplink communications signal 36D(2), 50U(2) (block 124), this is an indication that frequency interference is likely to occur with the second downlink or uplink communications signal 36D(2), 50U(2) in the combined downlink or uplink electrical multi-frequency communications signal 62D, 62U. Thus, the controller 58D, 58U frequency shifts the frequency band (or frequency channel) of the first downlink or uplink communications signal 36D(1), 50U(1) so that the low spurious interfering signal product ($SPUR_L$) will fall outside low and high frequency bands ($F_{LB2}$ and $F_{HB2}$) (or low and high frequency channels) of the second downlink or uplink communications signal 36D(2), 50U(2) (block 126), and the process repeats.

With continuing reference to FIG. 8, if the low spurious interfering signal product ($SPUR_L$) does not fall between the low and high frequency bands ($F_{LB2}$ and $F_{HB2}$) (or low and high frequency channels) of the second downlink or uplink communications signal 36D(2), 50U(2) (block 124), the controller 58D, 58U then predicts frequency band interference (or frequency channel interference) in the combined downlink or uplink electrical multi-frequency communications signal 62D, 62U based on calculating high spurious interfering signal product ($SPUR_H$) (block 128). The controller 58D, 58U then determines if the calculating high spurious interfering signal product ($SPUR_H$) falls between the low and high frequency bands ($F_{LB2}$ and $F_{HB2}$) (or frequency channels) of the second downlink or uplink communications signal 36D(2), 50U(2) (block 130). If so, the controller 58D, 58U frequency shifts the frequency band (or frequency channel) of the first downlink or uplink communications signal 36D(1), 50U(1) so that the high spurious interfering signal product ($SPUR_H$) will fall outside low and high frequency bands ($F_{LB2}$ and $F_{HB2}$) (or low and high frequency channels) of the second downlink or uplink communications signal 36D(2), 50U(2) (block 126), and the process repeats.

Figure 9:
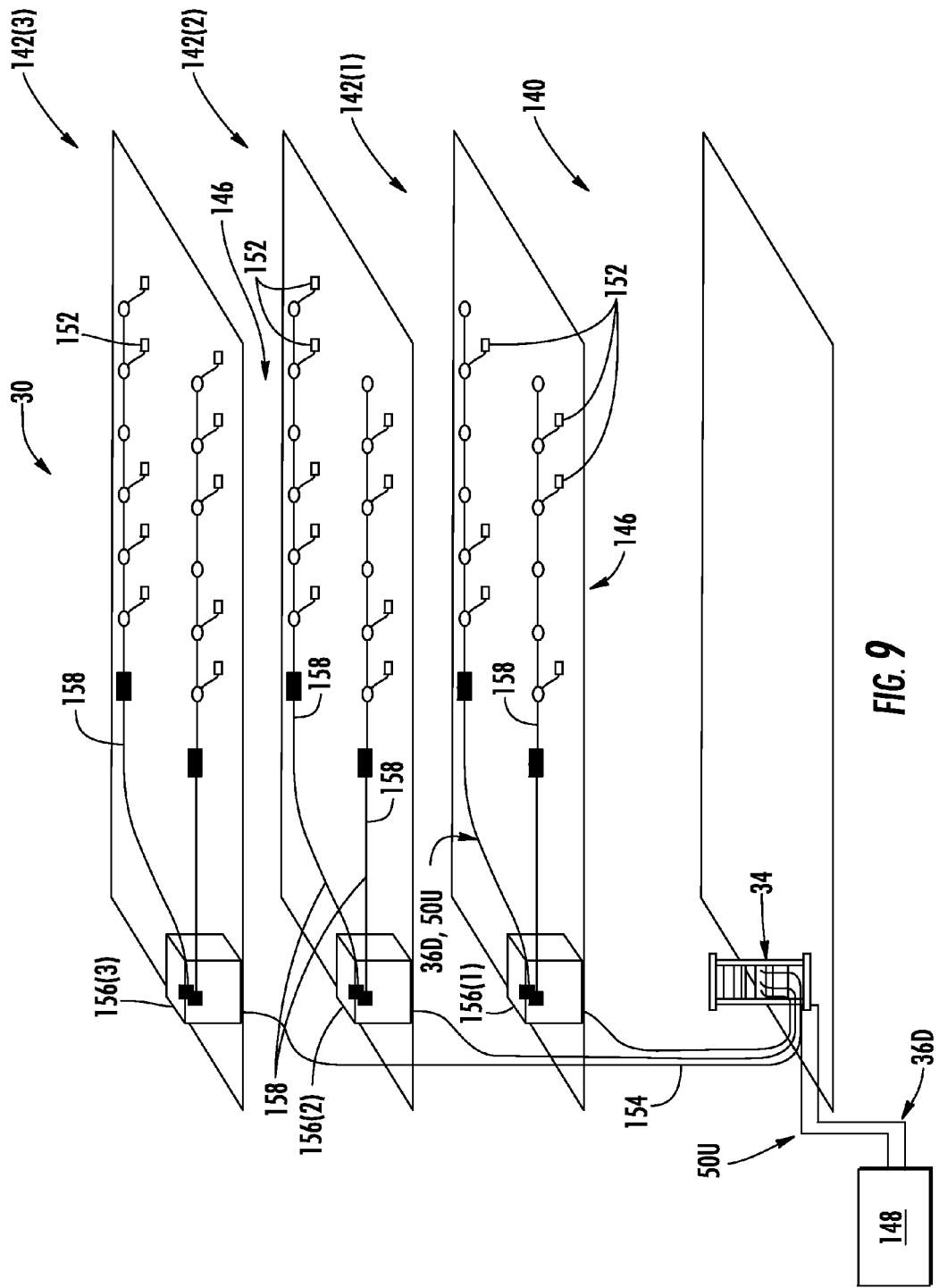
FIG. 9 is a partially schematic cut-away diagram of an exemplary building infrastructure in which a multi-frequency DAS configured to predict frequency interference and perform frequency shifting of an in-use communications signal(s) to avoid or reduce frequency interference can be employed.

The multi-frequency DAS 30 in FIG. 2 that includes the frequency interference prediction circuit 80 in FIG. 6 performing frequency shifting of a communications signal(s) 84 to avoid or reduce frequency interference is disclosed may be provided in an indoor environment, as illustrated in FIG. 9. In this regard, FIG. 9 is a partially schematic cut-away diagram of a building infrastructure 140 employing the multi-frequency DAS 30 that includes the frequency interference prediction circuit 80 in FIG. 6 described above. The building infrastructure 140 in this embodiment includes a first (ground) floor 142(1), a second floor 142(2), and a third floor 142(3). The floors 142(1)-142(3) are serviced by the central unit 34 to provide the antenna coverage areas 146 in the building infrastructure 140. The central unit 34 is communicatively coupled to the base station 148 to receive downlink communications signals 36D from the base station 148. The central unit 34 is communicatively coupled to the remote antenna units 152 to receive the uplink communications signals 50U from the remote antenna units 152, as previously discussed above. The downlink and uplink communications signals 36D, 50U communicated between the central unit 34 and the remote antenna units 152 are carried over a riser cable 154. The riser cable 154 may be routed through interconnect units (ICUs) 156(1)-156(3) dedicated to each floor 142(1)-142(3) that route the downlink and uplink communications signals 36D, 50U to the remote antenna units 152 and also provide power to the remote antenna units 152 via array cables 158.

Figure 10:
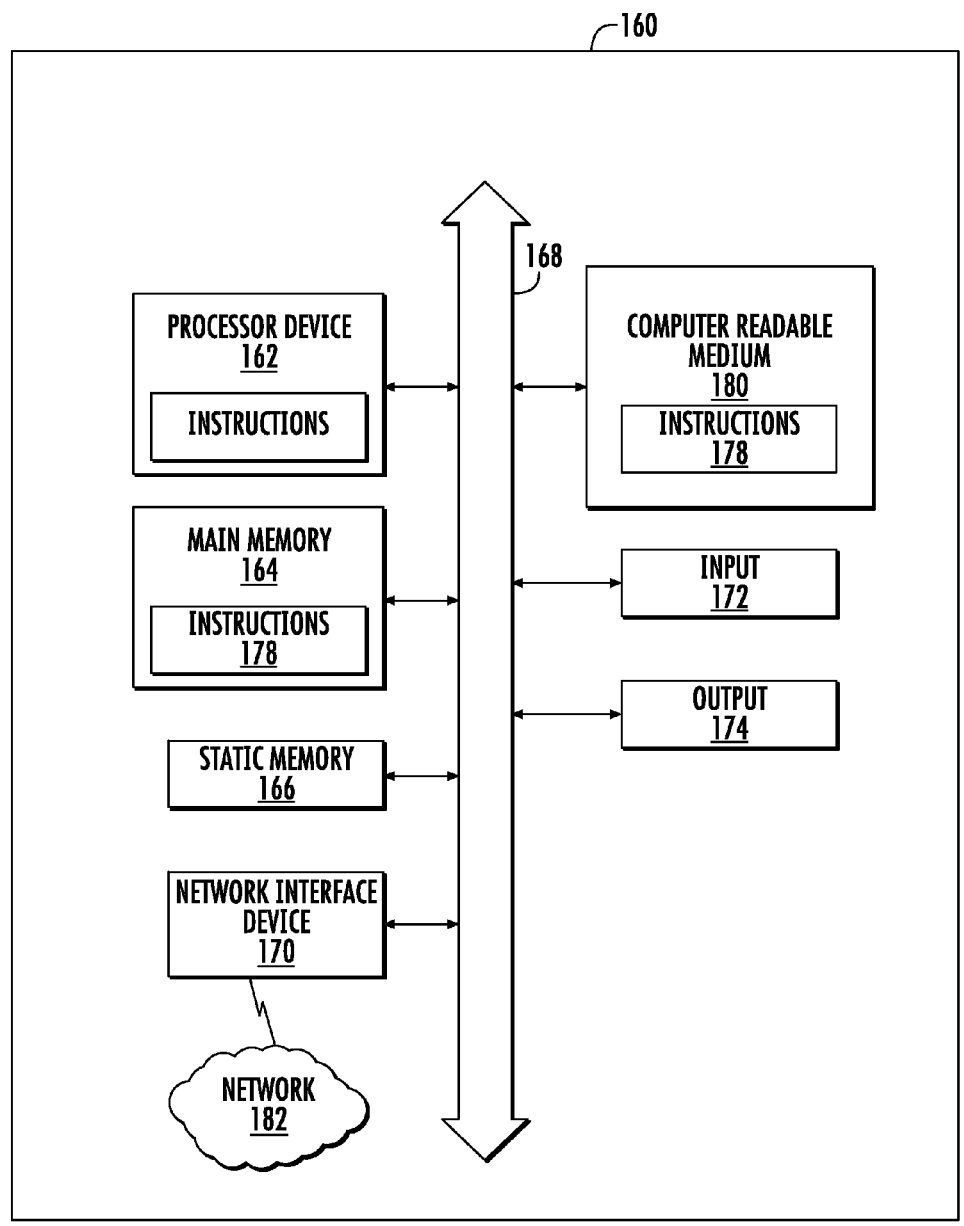
FIG. 10 is a schematic diagram of a generalized representation of an exemplary controller that can be included in any central unit, remote units, wireless client devices, and/or any other components of a multi-frequency DAS.

FIG. 10 is a schematic diagram representation of additional detail illustrating a computer system 160 that could be employed in the controllers 58D, 58U disclosed herein for controlling the frequency shifting of a communications signal(s) in a multi-frequency DAS to avoid or reduce frequency interference. In this regard, the computer system 160 is adapted to execute instructions from an exemplary computer-readable medium to perform these and/or any of the functions or processing described herein.

In this regard, the computer system 160 in FIG. 10 may include a set of instructions that may be executed to predict frequency interference to avoid or reduce interference in a multi-frequency DAS. The computer system 160 may be connected (e.g., networked) to other machines in a LAN, an intranet, an extranet, or the Internet. While only a single device is illustrated, the term "device" shall also be taken to include any collection of devices that individually or jointly execute a set (or multiple sets) of instructions to perform any one or more of the methodologies discussed herein. The computer system 160 may be a circuit or circuits included in an electronic board card, such as, a printed circuit board (PCB), a server, a personal computer, a desktop computer, a laptop computer, a personal digital assistant (PDA), a computing pad, a mobile device, or any other device, and may represent, for example, a server or a user's computer.

The exemplary computer system 160 in this embodiment includes a processing device or processor 162, a main memory 164 (e.g., read-only memory (ROM), flash memory, dynamic random access memory (DRAM), such as synchronous DRAM (SDRAM), etc.), and a static memory 166 (e.g., flash memory, static random access memory (SRAM), etc.), which may communicate with each other via a data bus 168. Alternatively, the processor 162 may be connected to the main memory 164 and/or static memory 166 directly or via some other connectivity means. The processor 162 may be a controller, and the main memory 164 or static memory 166 may be any type of memory.

The processor 162 represents one or more general-purpose processing devices, such as a microprocessor, central processing unit, or the like. More particularly, the processor 162 may be a complex instruction set computing (CISC) microprocessor, a reduced instruction set computing (RISC) microprocessor, a very long instruction word (VLIW) microprocessor, a processor implementing other instruction sets, or other processors implementing a combination of instruction sets. The processor 162 is configured to execute processing logic in instructions for performing the operations and steps discussed herein.

The computer system 160 may further include a network interface device 170. The computer system 160 also may or may not include an input 172, configured to receive input and selections to be communicated to the computer system 160 when executing instructions. The computer system 160 also may or may not include an output 174, including but not limited to a display, a video display unit (e.g., a liquid crystal display (LCD) or a cathode ray tube (CRT)), an alphanumeric input device (e.g., a keyboard), and/or a cursor control device (e.g., a mouse).

The computer system 160 may or may not include a data storage device that includes instructions 178 stored in a computer-readable medium 180. The instructions 178 may also reside, completely or at least partially, within the main memory 164 and/or within the processor 162 during execution thereof by the computer system 160, the main memory 164 and the processor 162 also constituting computer-readable medium. The instructions 178 may further be transmitted or received over a network 182 via the network interface device 170.

While the computer-readable medium 180 is shown in an exemplary embodiment to be a single medium, the term "computer-readable medium" should be taken to include a single medium or multiple media (e.g., a centralized or distributed database, and/or associated caches and servers) that store the one or more sets of instructions. The term "computer-readable medium" shall also be taken to include any medium that is capable of storing, encoding, or carrying a set of instructions for execution by the processing device and that cause the processing device to perform any one or more of the methodologies of the embodiments disclosed herein. The term "computer-readable medium" shall accordingly be taken to include, but not be limited to, solid-state memories, optical medium, and magnetic medium.

The embodiments disclosed herein include various steps. The steps of the embodiments disclosed herein may be formed by hardware components or may be embodied in machine-executable instructions, which may be used to cause a general-purpose or special-purpose processor programmed with the instructions to perform the steps. Alternatively, the steps may be performed by a combination of hardware and software.

The embodiments disclosed herein may be provided as a computer program product, or software, that may include a machine-readable medium (or computer-readable medium) having stored thereon instructions, which may be used to program a computer system (or other electronic devices) to perform a process according to the embodiments disclosed herein. A machine-readable medium includes any mechanism for storing or transmitting information in a form readable by a machine (e.g., a computer). For example, a machine-readable medium includes: a machine-readable storage medium (e.g., ROM, random access memory ("RAM"), a magnetic disk storage medium, an optical storage medium, flash memory devices, etc.); and the like.

Unless specifically stated otherwise and as apparent from the previous discussion, it is appreciated that throughout the description, discussions utilizing terms such as "processing," "computing," "determining," "displaying," or the like, refer to the action and processes of a computer system, or similar electronic computing device, that manipulates and transforms data and memories represented as physical (electronic) quantities within the computer system's registers into other data similarly represented as physical quantities within the computer system memories or registers or other such information storage, transmission, or display devices.

The algorithms and displays presented herein are not inherently related to any particular computer or other apparatus. Various systems may be used with programs in accordance with the teachings herein, or it may prove convenient to construct more specialized apparatuses to perform the required method steps. The required structure for a variety of these systems will appear from the description above. In addition, the embodiments described herein are not described with reference to any particular programming language. It will be appreciated that a variety of programming languages may be used to implement the teachings of the embodiments as described herein.

Those of skill in the art will further appreciate that the various illustrative logical blocks, modules, circuits, and algorithms described in connection with the embodiments disclosed herein may be implemented as electronic hardware, instructions stored in memory or in another computer-readable medium and executed by a processor or other processing device, or combinations of both. The components of the distributed antenna systems described herein may be employed in any circuit, hardware component, integrated circuit (IC), or IC chip, as examples. Memory disclosed herein may be any type and size of memory and may be configured to store any type of information desired. To clearly illustrate this interchangeability, various illustrative components, blocks, modules, circuits, and steps have been described above generally in terms of their functionality. How such functionality is implemented depends on the particular application, design choices, and/or design constraints imposed on the overall system. Skilled artisans may implement the described functionality in varying ways for each particular application, but such implementation decisions should not be interpreted as causing a departure from the scope of the present embodiments.

The various illustrative logical blocks, modules, and circuits described in connection with the embodiments disclosed herein may be implemented or performed with a processor, a Digital Signal Processor (DSP), an Application Specific Integrated Circuit (ASIC), a Field Programmable Gate Array (FPGA), or other programmable logic device, a discrete gate or transistor logic, discrete hardware components, or any combination thereof designed to perform the functions described herein. Furthermore, a controller may be a processor. A processor may be a microprocessor, but in the alternative, the processor may be any conventional processor, controller, microcontroller, or state machine. A processor may also be implemented as a combination of computing devices (e.g., a combination of a DSP and a microprocessor, a plurality of microprocessors, one or more microprocessors in conjunction with a DSP core, or any other such configuration).

The embodiments disclosed herein may be embodied in hardware and in instructions that are stored in hardware, and may reside, for example, in RAM, flash memory, ROM, Electrically Programmable ROM (EPROM), Electrically Erasable Programmable ROM (EEPROM), registers, a hard disk, a removable disk, a CD-ROM, or any other form of computer-readable medium known in the art. An exemplary storage medium is coupled to the processor such that the processor can read information from, and write information to, the storage medium. In the alternative, the storage medium may be integral to the processor. The processor and the storage medium may reside in an ASIC. The ASIC may reside in a remote station. In the alternative, the processor and the storage medium may reside as discrete components in a remote station, base station, or server.

The operational steps described herein may be performed in numerous different sequences other than the illustrated sequences. Operation described in a single operational step may actually be performed in a number of different steps, and one or more operational steps may be combined. Information and signals may be represented using any of a variety of technologies and techniques. For example, data, instructions, commands, information, signals, bits, symbols, and chips, that may be references throughout the above description, may be represented by voltages, currents, electromagnetic waves, magnetic fields, or particles, optical fields or particles, or any combination thereof. Unless otherwise expressly stated, it is in no way intended that any method set forth herein be construed as requiring that its steps be performed in a specific order.

Various modifications and variations can be made without departing from the spirit or scope of the invention. The invention should be construed to include everything within the scope of the appended claims and their equivalents.

What is claimed is:

1. A multiple frequency (multi-frequency) distributed antenna system (DAS), comprising:
   a central unit configured to:
      receive a combined uplink multi-frequency communications signal from a plurality of remote units;
      receive a first downlink communications signal in at least one first frequency range and a second downlink communications signal in at least one second frequency range different from the at least one first frequency range; and
      distribute the first downlink communications signal as an output first downlink communications signal to a first downlink communications signal path output and the second downlink communications signal as an output second downlink communications signal to a second downlink communications signal path output;
   the central unit comprising:
      a combiner communicatively coupled to the first downlink communications signal path output and the second downlink communications signal path output, the combiner configured to combine the output first downlink communications signal and the output second downlink communications signal into a combined downlink multi-frequency communications signal; and
   the plurality of remote units each configured to:
      receive the combined downlink multi-frequency communications signal from the central unit and distribute the combined downlink multi-frequency communications signal from the central unit to at least one client device;
      receive a first uplink communications signal in at least one first frequency range and a second uplink communications signal in at least one second frequency range different from the at least one first frequency range; and
      distribute the first uplink communications signal as an output first uplink communications signal to a first uplink communications signal path output and the second uplink communications signal as an output second uplink communications signal to a second uplink communications signal path output;
   each of the plurality of remote units comprising:
      a combiner communicatively coupled to the first uplink communications signal path output and the second uplink communications signal path output, the combiner configured to combine the output first uplink communications signal and the output second uplink communications signal into a combined uplink multi-frequency communications signal;
   a frequency interference prediction system, comprising:
      a first communications signal path, comprising:
         a first frequency shifting circuit configured to frequency shift at least one first communications signal among the first downlink communications signal and the first uplink communications signal from a first frequency to a shifted first communications signal at a shifted first frequency based on a first frequency control signal;
      a second communications signal path configured to provide at least one second communications signal among the second downlink communications signal and the second uplink communications signal as an output second communications signal to a second communications signal path output among the second downlink communications signal path output and the second uplink communications signal path output; and
      a controller configured to:
         predict frequency interference in a combined multi-frequency communications signal among the combined downlink multi-frequency communications signal and the combined uplink multi-frequency communications signal;
         if frequency interference is predicted in the combined multi-frequency communications signal:
            determine the shifted first frequency to shift the at least one first communications signal in the combined multi-frequency communications signal; and
            set the first frequency control signal to cause the first frequency shifting circuit to frequency shift the at least one first communications signal to the shifted first communications signal at the shifted first frequency.

2. The multi-frequency DAS of claim 1, wherein the frequency interference prediction system comprises:
   a communications signal interface, comprising:

a first communications signal interface configured to receive the at least one first communications signal in the at least one first frequency range; and a second communications signal interface configured to receive the at least one second communications signal in the at least one second frequency range different from the at least one first frequency range.

3. The multi-frequency DAS of claim 1, wherein:
the controller is configured to:
predict the frequency interference in the combined multi-frequency communications signal based on a first interfering signal product generated from signal processing of the at least one first communications signal in the multi-frequency DAS, interfering in the at least one second frequency range of the at least one second communications signal; and
if frequency interference from the first interfering signal product is predicted in the combined multi-frequency communications signal, the controller is configured to determine the shifted first frequency to shift the at least one first communications signal in the combined multi-frequency communications signal so that the first interfering signal product does not interfere with the at least one second frequency range of the at least one second communications signal.

4. The multi-frequency DAS of claim 1, wherein:
the controller is configured to:
predict the frequency interference in the combined multi-frequency communications signal, based on a second interfering signal product generated from signal processing of the at least one second communications signal in the multi-frequency DAS interfering in the at least one first frequency range of the at least one first communications signal; and
if frequency interference from the second interfering signal product is predicted in the combined multi-frequency communications signal, the controller is configured to determine the shifted first frequency to shift the at least one first communications signal in the combined multi-frequency communications signal so that the second interfering signal product does not interfere with the at least one first frequency range of the at least one first communications signal.

5. The multi-frequency DAS of claim 3, wherein the second communications signal path comprises a second frequency shifting circuit configured to frequency shift the at least one second communications signal from a second frequency to a shifted second communications signal at a shifted second frequency based on a second frequency control signal.

6. The multi-frequency DAS of claim 3, further comprising a first selector circuit configured to selectively provide the at least one first communications signal or the shifted first communications signal as an output first communications signal to a first communications signal path output, in response to a first selector control signal;
the controller further configured to, if frequency interference is predicted in the combined multi-frequency communications signal, generate the first selector control signal to cause the first selector circuit to provide the shifted first communications signal as the output first communications signal to the first communications signal path output.

7. The multi-frequency DAS of claim 6, further comprising a second selector circuit configured to selectively provide the at least one second communications signal or a shifted second communications signal as the output second communications signal to the second communications signal path output, in response to a second selector control signal.

8. The multi-frequency DAS of claim 7, wherein:
if frequency interference from the first interfering signal product generated from signal processing of the at least one first communications signal in the multi-frequency DAS is predicted in the combined multi-frequency communications signal, the controller is further configured to generate the second selector control signal to cause the second selector circuit to provide the at least one second communications signal as the output second communications signal to the second communications signal path output.

9. The multi-frequency DAS of claim 5, wherein the controller is further configured to:
predict frequency interference in the combined multi-frequency communications signal based on a second interfering signal product generated from signal processing of the at least one second communications signal in the multi-frequency DAS, interfering in the at least one first frequency range of the at least one first communications signal;
if frequency interference from the second interfering signal product is predicted in the combined multi-frequency communications signal:
determine the shifted second frequency to shift the at least one second communications signal based on the predicted frequency interference in the combined multi-frequency communications signal so that the second interfering signal product does not interfere with the at least one first frequency range of the at least one first communications signal.

10. The multi-frequency DAS of claim 3, wherein:
the at least one first communications signal is in a first frequency band;
the at least one second communications signal is in a second frequency band;
the first frequency shifting circuit is configured to frequency shift the at least one first communications signal from the first frequency band to the shifted first communications signal at a shifted first frequency band based on the first frequency control signal; and
the controller is configured to:
predict frequency band interference in the combined multi-frequency communications signal, based on the first interfering signal product generated from signal processing of the at least one first communications signal in the multi-frequency DAS interfering in the second frequency band of the at least one second communications signal;
if the frequency band interference from the first interfering signal product is predicted in the combined multi-frequency communications signal, set the first frequency control signal to cause the first frequency shifting circuit to frequency shift the at least one first communications signal to the shifted first communications signal at the shifted first frequency outside of the second frequency band of the at least one second communications signal.

11. The multi-frequency DAS of claim 10, wherein the controller is configured to:
predict the frequency band interference in the combined multi-frequency communications signal by being configured to:

calculate at least one first spurious interfering signal product generated from signal processing of the at least one first communications signal in the multi-frequency DAS; and determine if a frequency of the at least one first spurious interfering signal product is contained in the second frequency band of the at least one second communications signal; and if the frequency of the at least one first spurious interfering signal product is contained in the second frequency band of the at least one second communications signal, the controller is configured to set the first frequency control signal to cause the first frequency shifting circuit to frequency shift the at least one first communications signal to the shifted first communications signal at the shifted first frequency outside of the second frequency band of the at least one second communications signal.

12. The multi-frequency DAS of claim 4, wherein:

the at least one first communications signal is in a first frequency band;

the at least one second communications signal is in a second frequency band;

the first frequency shifting circuit is configured to frequency shift the at least one first communications signal from the first frequency band to the shifted first communications signal at a shifted first frequency band based on the first frequency control signal; and the controller is configured to:

predict frequency band interference in the combined multi-frequency communications signal based on the second interfering signal product generated from signal processing of the at least one second communications signal in the multi-frequency DAS, interfering in the first frequency band of the at least one first communications signal;

if the frequency band interference from the second interfering signal product is predicted in the combined multi-frequency communications signal, set the first frequency control signal to cause the first frequency shifting circuit to frequency shift the at least one first communications signal to the shifted first communications signal at the shifted first frequency outside of a frequency of the second interfering signal product and outside of the second frequency band of the at least one second communications signal.

13. The multi-frequency DAS of claim 12, wherein the controller is configured to:

predict the frequency band interference in the combined multi-frequency communications signal by being configured to:

calculate at least one second spurious interfering signal product generated from signal processing of the at least one second communications signal in the multi-frequency DAS; and determine if a frequency of the at least one second spurious interfering signal product is contained in the first frequency band of the at least one first communications signal; and if the frequency of the at least one second spurious interfering signal product is contained in the first frequency band of the at least one first communications signal, the controller is configured to set the first frequency control signal to cause the first frequency shifting circuit to frequency shift the at least one first communications signal to the shifted first communications signal at the shifted first frequency outside of the frequency of the second interfering signal product and outside of the second frequency band of the at least one second communications signal.

14. The multi-frequency DAS of claim 3, wherein:

the at least one first communications signal is in at least one first frequency channel;

the at least one second communications signal is in at least one second frequency channel;

the first frequency shifting circuit is configured to frequency shift the at least one first communications signal from the at least one first frequency channel to the shifted first communications signal at a shifted first frequency channel based on the first frequency control signal; and the controller is configured to:

predict frequency channel interference in the combined multi-frequency communications signal based on the first interfering signal product generated from signal processing of the at least one first communications signal in the multi-frequency DAS, interfering in the at least one second frequency channel of the at least one second communications signal;

if the frequency channel interference from the first interfering signal product is predicted in the combined multi-frequency communications signal, set the first frequency control signal to cause the first frequency shifting circuit to frequency shift the at least one first communications signal to the shifted first communications signal at the shifted first frequency channel outside of the at least one second frequency channel of the at least one second communications signal.

15. The multi-frequency DAS of claim 4, wherein:

the at least one first communications signal is in at least one first frequency channel;

the at least one second communications signal is in at least one second frequency channel;

the first frequency shifting circuit is configured to frequency shift the at least one first communications signal from the at least one first frequency channel to the shifted first communications signal at a shifted first frequency channel based on the first frequency control signal; and the controller is configured to:

predict frequency channel interference in the combined multi-frequency communications signal based on the second interfering signal product generated from signal processing of the at least one second communications signal in the multi-frequency DAS, interfering in the at least one first frequency channel of the at least one first communications signal;

if the frequency channel interference from the second interfering signal product is predicted in the combined multi-frequency communications signal, set the first frequency control signal to cause the first frequency shifting circuit to frequency shift the at least one first communications signal to the shifted first communications signal at the shifted first frequency channel outside of a frequency of the second interfering signal product and outside of the at least one second frequency channel.

16. The multi-frequency DAS of claim 1, wherein the frequency interference prediction system is disposed in the central unit.

17. The multi-frequency DAS of claim 1, wherein the frequency interference prediction system is disposed in at least one remote unit among the plurality of remote units.

18. The multi-frequency DAS of claim 1, wherein the controller is further configured to provide a synchronization control signal based on the first frequency control signal in the combined multi-frequency communications signal.

19. The multi-frequency DAS of claim 18, wherein the central unit is further configured to combine the combined downlink multi-frequency communications signal with the synchronization control signal into a combined downlink signal.

20. The multi-frequency DAS of claim 19, wherein at least one remote unit among the plurality of remote units is further configured to separate the combined downlink signal into the combined downlink multi-frequency communications signal and the synchronization control signal.

21. The multi-frequency DAS of claim 18, wherein at least one remote unit among the plurality of remote units is further configured to combine the first uplink communications signal with the synchronization control signal into a combined uplink signal.

22. The multi-frequency DAS of claim 21, wherein the central unit is further configured to separate the combined uplink signal into the first uplink communications signal and the synchronization control signal.

23. The multi-frequency DAS of claim 1, further comprising an electrical-to-optical converter configured to convert the combined multi-frequency communications signal into an optical combined multi-frequency communications signal.

24. The multi-frequency DAS of claim 1, wherein the first frequency shifting circuit comprises:
 a first synthesizer configured to receive the first frequency control signal and generate a first mixing frequency signal based on the received first frequency control signal; and
 a first mixer configured to receive the first mixing frequency signal and the at least one first communications signal, and mix the first mixing frequency signal with the at least one first communications signal to generate the shifted first communications signal.

25. The multi-frequency DAS of claim 1 installed in an indoor building.

* * * * *